United States Patent [19]

Watanabe et al.

[11] Patent Number: 4,671,648

[45] Date of Patent: Jun. 9, 1987

[54] IMAGE DATA PROCESSING APPARATUS

[75] Inventors: Izumi Watanabe; Keiichi Yamana, both of Kanagawa, Japan

[73] Assignee: Fuji Photo Film Co., Ltd., Kanagawa, Japan

[21] Appl. No.: 884,344

[22] Filed: Jul. 11, 1986

[51] Int. Cl.$^4$ ............................................. G03B 27/52
[52] U.S. Cl. ........................................ 355/40; 355/43; 355/41
[58] Field of Search .............................. 355/40, 41, 43

[56] References Cited

U.S. PATENT DOCUMENTS

| | | | |
|---|---|---|---|
| 3,290,987 | 12/1966 | James et al. | 355/40 |
| 3,853,399 | 12/1974 | Walsh | 355/40 |
| 3,885,866 | 5/1975 | Stearns | 355/41 |
| 3,941,981 | 3/1976 | Abe et al. | 355/40 |
| 3,987,467 | 10/1976 | Cowles | 355/40 |
| 4,134,674 | 1/1979 | Ohsaki et al. | 355/43 |

Primary Examiner—Monroe H. Hayes
Attorney, Agent, or Firm—Sughrue, Mion, Zinn, Macpeak, and Seas

[57] ABSTRACT

An image data processing apparatus obtains a first absolute address of a frame by reading marks which are provided on a recording medium for the purpose of setting absolute addresses. Divisions which separate the frames on the recording medium into blocks are input, together with the relative addresses of the frames within the divisions. The apparatus stores frame data in such a manner that the divisions, the relative addresses of the frames of each of the divisions, and the absolute addresses of the frames are arranged so as to correspond to each other. The apparatus obtains a second absolute address of a frame to be processed which address corresponds to the input division and the input relative address of the frame within the division. An amount of feed of the recording medium which is needed to move the frame to be processed to the processing position is calculated from the difference between the first and second absolute addresses, and the frame to be processed is moved to the processing position in accordance with the calculated amount of feed. Thus, the image of the frame present at the processing position is processed. Accordingly, frame images can be readily put in order, and retrieval thereof is facilitated.

22 Claims, 20 Drawing Figures

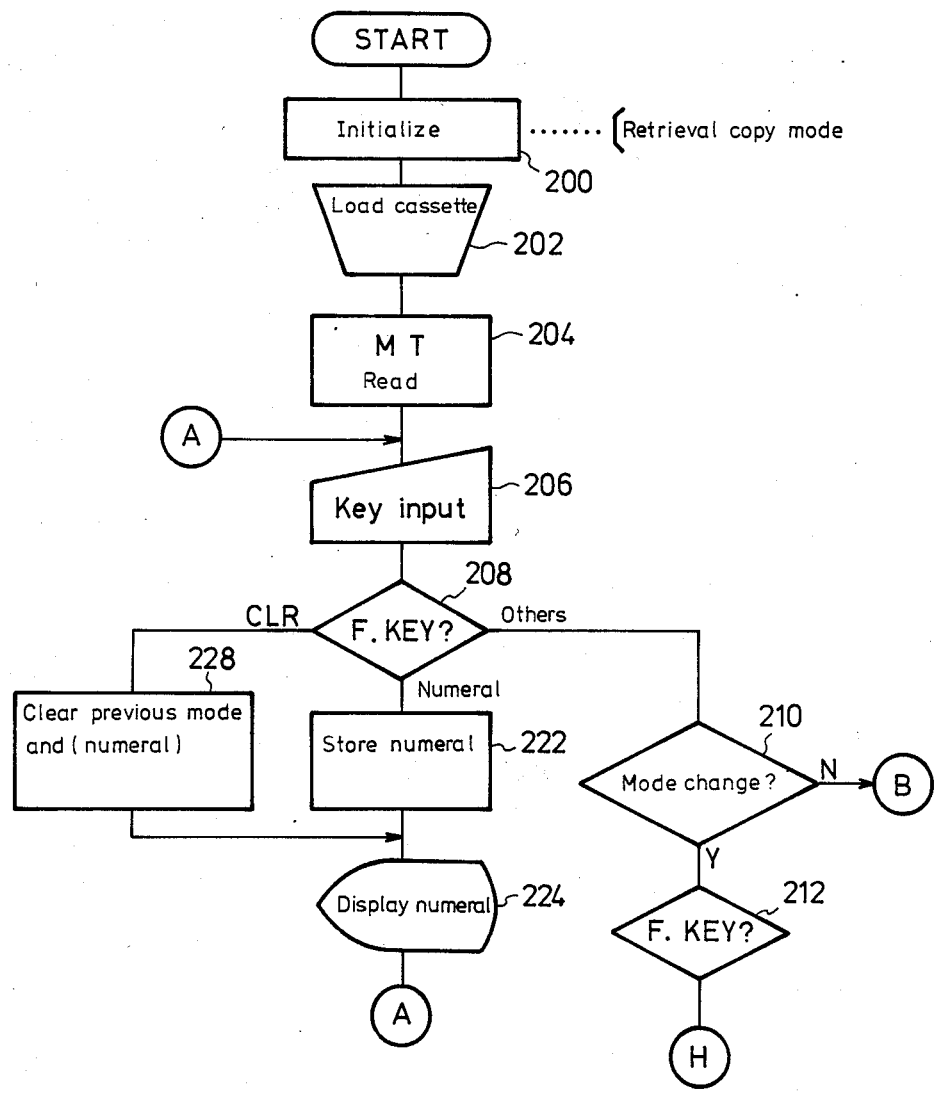

| F (Folder) | 100 | | | | | | 200 | | | | | | 100 | | | | |
|---|---|---|---|---|---|---|---|---|---|---|---|---|---|---|---|---|---|
| J (Item) | | 1 | | | 2 | | | 2 | | | 3 | | | 3 | | | 2 |
| P (Page) | 1 | 2 | 3 | 1 | 2 | 3 | 1 | 2 | 3 | 1 | 2 | 3 | 1 | 2 | 3 | | 2 |
| File mark | 10 | 20 | | | | | 10 | 20 | | | | | | | | | 1000 |
| Absolute address | 1 | 2 | 3 | 4 | 5 | 6 | 7 | 8 | 9 | 10 | 11 | 12 | 13 | 14 | 15 | 16 | |
| C (Recording completed) | 1 | 1 | 1 | 1 | 0 | 0 | 1 | 1 | 1 | 1 | 0 | 0 | 0 | 0 | 0 | 0 | 0 |
| M (Recording mistake) | 0 | 0 | 0 | 0 | 1 | 0 | 0 | 0 | 0 | 0 | 0 | 0 | 0 | 0 | 0 | 0 | 0 |

FIG. 7

| L | 1 | 2 | |
|---|---|---|---|
| F (Folder) | 100 | 200 | END |

FIG. 9

| C | F | J | P | M | S | | |
|---|---|---|---|---|---|---|---|
| | | | | | | Absolute address | File mark |

FIG. 8

| A | 0 | 5 | 10 | 15 | 20 | 25 | 30 | 35 | 40 | 45 | 50 | 55 | 60 | 65 | 70 | 75 | 80 |
|---|---|---|---|---|---|---|---|---|---|---|---|---|---|---|---|---|---|
| F J P | F | P | P | J | P | P | P | J | P | P | F | P | J | P | J | P | END |
| Absolute address | 1 | 2 | 3 | 4 | 5 | 1000 | 6 | 13 | 14 | 15 | 7 | 8 | 9 | 10 | 11 | 12 | 16 |
| | ↑b | | ↑a | | | ↑f | | | | | ↑c | | ↑d | | ↑e | | | |

IMAGE DATA PROCESSING APPARATUS

BACKGROUND OF THE INVENTION

1. Field of the Invention

The present invention relates to an image data processing apparatus adapted to record a frame image on a recording medium such as film and effect retrieval, projection and copying of a frame image which has already been recorded.

2. Description of the Related Art

In a conventional image data processing apparatus of the type described above, frame images are recorded on, for example, film accordingly to physical order, that is, sequential order.

For this reason, the conventional apparatus suffers from the following problems. Namely, in the case where various kinds of frame image are recorded at random on one film, if the operator forgets a particular retrieval number, he must search for the frame image concerned by projecting frame images one by one until it is found, and in such case, it may be necessary to project a large number of frame images unconcerned. In addition, to record frame images of the same kind in order, it is necessary to consider the physical arrangement of the frame images on the film and also to arrange documents to be recorded in order before recording them.

In the conventional image data processing apparatus, retrieval data is stored for each frame.

Accordingly, it is necessary to handle a large amount of retrieval data, which means that the retrieval operation is complicated and troublesome. When frame images of the same kind are retrieved using the same kind of retrieval data, it is also necessary to feed back and forth the film between positions which are spaced apart from each other since various kinds of frame image are mixed with each other on the same one film, and this leads to an increase in the load (tension and friction) on the film and also an increase in the time required for retrieval.

SUMMARY OF THE INVENTION

In view of the above-described circumstances, it is a primary object of the present invention to provide an image data processing apparatus which enables frame images to be readily recorded in order on a recording medium such as film (film will hereinafter be taken as an example of a recording medium) without the need to consider the physical arrangement of frame images on the film and which facilitates retrieval and permits a reduction in the amount of data required for retrieval.

To this end, the present invention provides an image data processing apparatus, which comprises: a recording medium provided with marks before a document is recorded thereon, the marks being employed to set absolute addresses respectively corresponding to frames in each of which a frame image and frame data are recorded; first absolute address determining means for obtaining the absolute address of a frame present at a processing position by counting the number of the marks; input means for inputting each of the divisions which separate the frames on the recording medium into blocks, together with the relative address of each of the frames within the input division; frame data memory means for storing frame data in such a manner that the divisions, the relative addresses of frames within each of the divisions, and the absolute addresses of the frames are arranged so as to correspond to each other; second absolute address determining means for obtaining the absolute address of a frame which is to be processed, the absolute address corresponding to the division and the relative address of the frame within the division which are input through the input means; feed amount calculating means for calculating an amount of feed of the recording medium which is needed to move the frame to be processed to the processing position from the difference between the absolute address obtained by the second absolute address determining means and the absolute address obtained by the first absolute address determining means; recording medium moving means for moving the frame to be processed to the processing position in accordance with the calculated amount of feed; and image processing means for processing the image of the frame present at the processing position, whereby frame images can be readily put in order, and retrieval thereof is facilitated.

Thus, according to the present invention, division data is input through the input means and stored in the frame data memory means before recording.

When recording, retrieval, projection or copying is carried out, division data and a relative address in the division are input through the input means. The second absolute address determining means obtains a target absolute address from the input division data, the input relative address in the division and the frame data stored in the frame data memory means. The recording medium moving means moves the frames on the film so that the present absolute address obtained by the first absolute address determining means is coincident with the obtained target absolute address.

BRIEF DESCRIPTION OF THE DRAWINGS

FIG. 7 shows a folder table;

FIG. 8 shows an address table used to obtain absolute addresses;

FIG. 9 shows a memory map showing the arrangement of frame data for one frame;

DESCRIPTION OF THE PREFERRED EMBODIMENT

Figure 1:
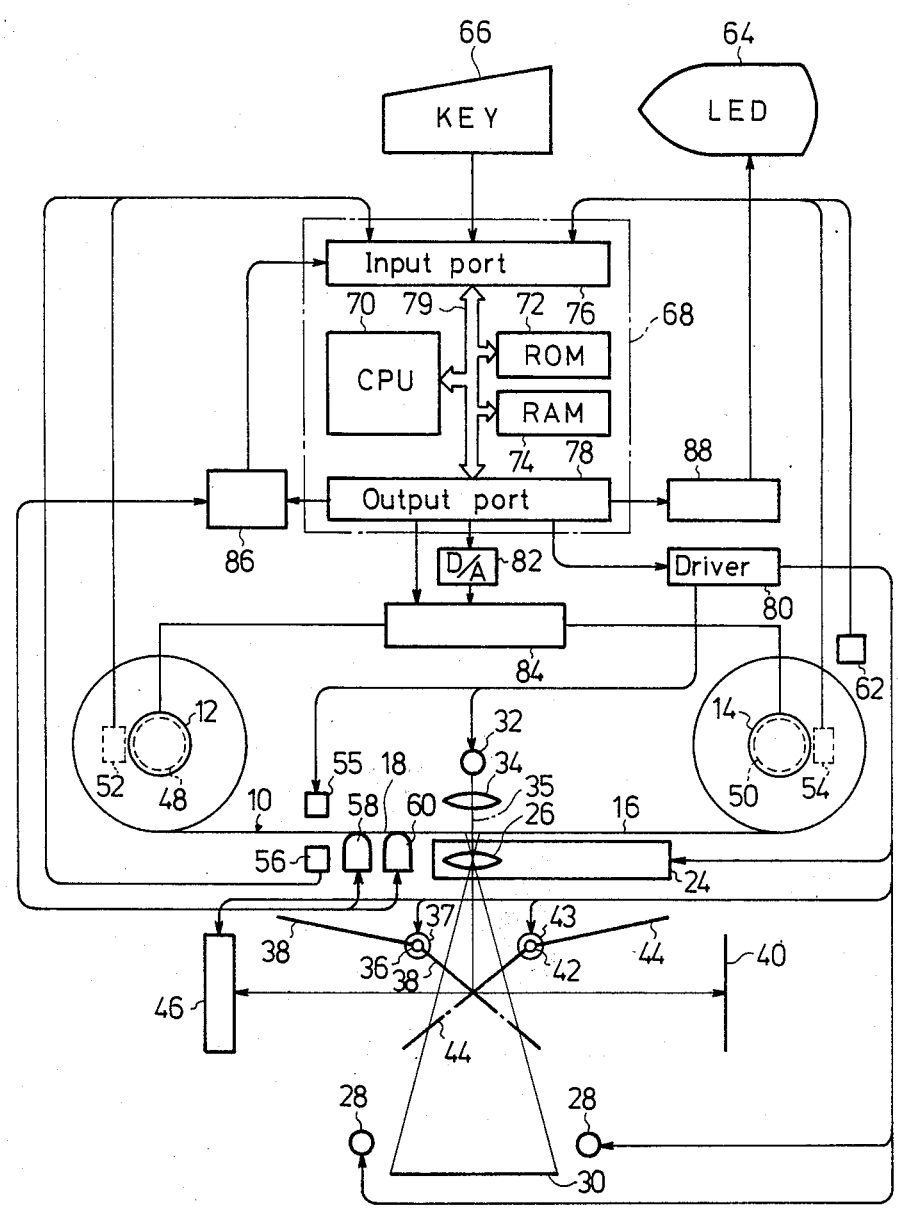
FIG. 1 schematically shows the arrangement of one embodiment of the image data processing apparatus according to the present ivention.

FIG. 1 shows the arrangement of one preferred embodiment of the present invention. In this embodiment, the image of a document 30 is recorded on an electrophotographic film 16 which defines a tape 10, and an image which has already been recorded on the film 16 is projected on a screen 40 or copied by a copying device 46.

One end of the tape 10 is secured to a take-up shaft 12, and the other end of the tape 10 is secured to another take-up shaft 14. The arrangement is such that the tape 10 wound up on the take-up shaft 14 is unwound and wound up on the take-up shaft 12.

Figures 5, 6:
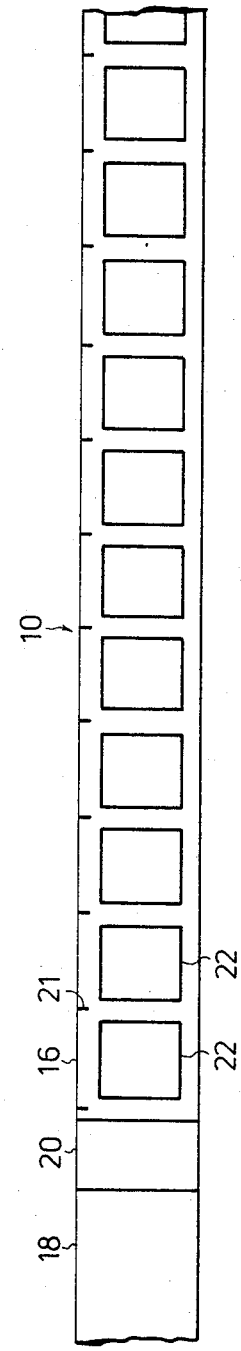
FIG. 5 is a fragmentary front view of a magnetic tape and an electrophotographic film which are spliced together.
FIG. 6 is a frame data table showing one example of frame data in which each relative address has a two-stratum structure.

The tape 10 is, as shown in FIG. 5, composed of an electrophotographic film 16 and a magnetic tape 18 which are spliced together by means of a piece of adhesive tape 20. Blip marks 21 are printed in advance on the upper edge (as viewed in FIG. 5) of the film 16 at a predetermined regular spacing, so that the absolute address of a particular frame can be obtained by counting the number of blip marks 21. A frame image 22 is recorded in an area between each pair of adjacent blip marks 21. The frame images 22 are not always necessary to record consecutively as shown in FIG. 5 and may be recorded at any desired positions which are spaced apart from each other as desired.

In this connection, it is important to print the blip marks 21 in advance at one frame spacing even on an area of the film 16 where the frame images 22 have not been recorded in order to determine "absolute address" (explained later on) of the frames which have been recorded or which is to be recorded.

Referring back to FIG. 1, a processing head 24 (e.g., one which is disclosed in Japanese Utility Model Laid-Open No. 158346/1984) is disposed in opposing relation to the electrophotographic film 16 so that frame images 22 are recorded on the film 16 through charging, light exposure, development, drying and fixing operations effected by the processing head 24. The head 24 has a lens 26 and is arranged such that the light from an illuminating light source 28 is reflected from a document 30 and passed throught the lens 26, and the image of the document 30 is thereby formed on the film 16 to effect light exposure.

A practical example of the processing head 24 will be explained below in detail.

Figure 2:
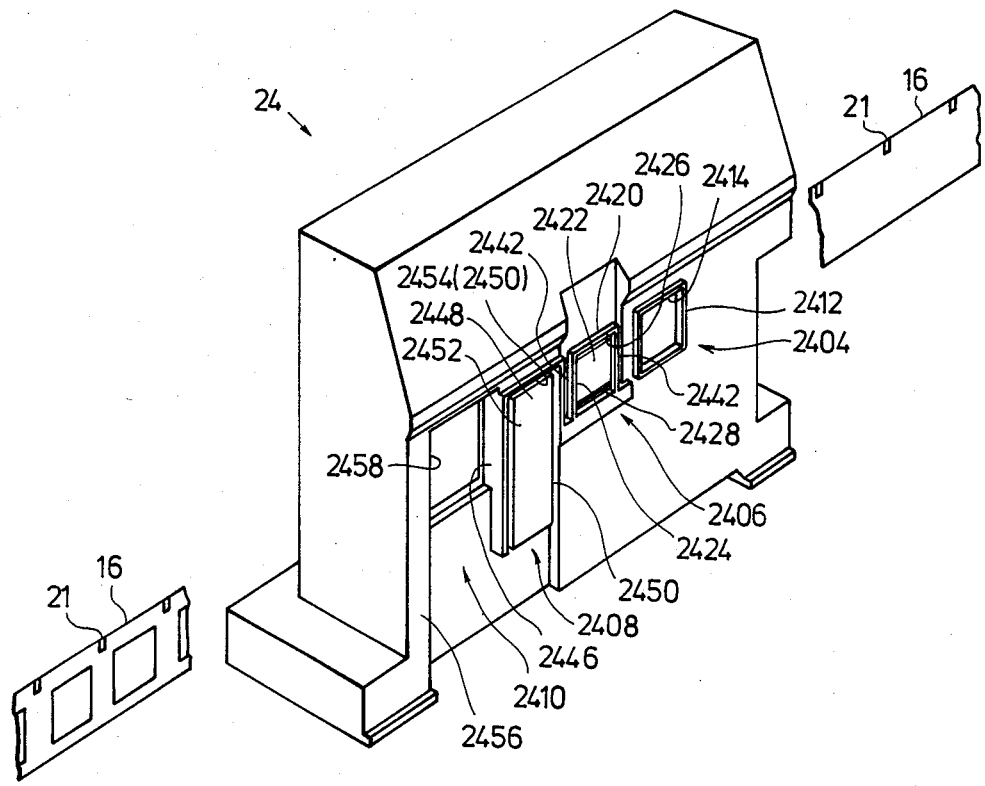
FIGS. 2(A) and 2(B) show in combination the arrangement of the processing head in the embodiment.
FIG. 2(C) is a perspective view showing the external appearance of the apparatus shown in FIG. 1.
Figure 2:
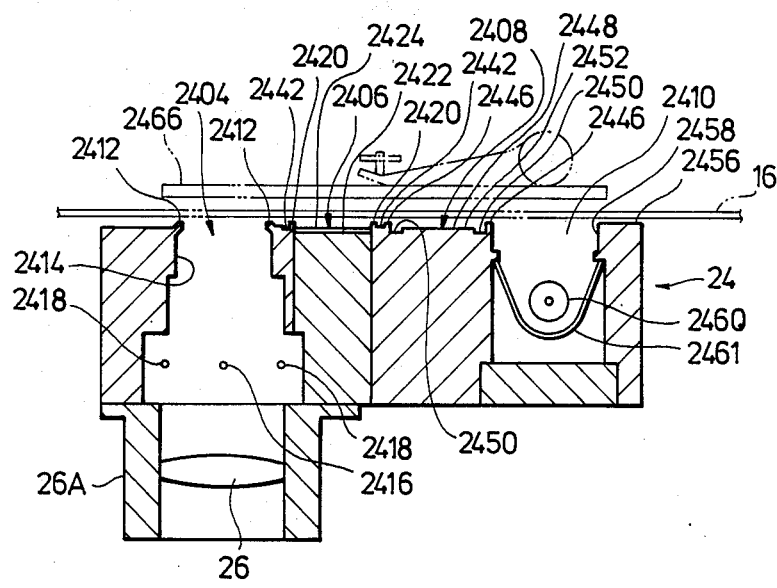

Referring to FIGS. 2(A) and 2(B), the processing head 24 has a charging exposure section 2404, a developing section 2406, a drying section 2408 and a fixing section 2410.

The charging exposure section 2404 is provided with a pair of projecting frames 2412 which are adapted to contact right and left edges, respectively, of each frame on the electrophotographic film 16. A charging exposure chamber 2414 is defined by a space which extends through the section 2404 horizontally (from the top to the bottom as viewed in FIG. 2(B)) from the opening defined between the frames 2412. In the charging exposure chamber 2412 are disposed a corona wire 2416 and corona electrodes 2418 which are respectively positioned on both sides of the wire 2416, the wire 2416 and the electrodes 2418 extending vertically (in a direction parallel to the longitudinal axes of the frames 2412). The lens 26 is mounted on the processing head 24 through a lens tube 26A at the side opposite to the frames 2412. It should be noted that the optical axis of the lens 26 is coincident with the center between the projecting frames 2412.

The developing section 2406 is provided with a pair of projecting frames 2420 in such a manner that the distance between the frames 2420 is slightly smaller than that between the projecting frames 2412. A developing electrode 2422 made from a metal sheet is disposed between the frames 2420 in such a manner that the outer surface of the electrode 2422 is located at a position which is slightly inner than the end face of each frame 2420. The space surrounded by the frames 2420 and the developing electrode 2422 defines a developing chamber 2424. An opening is provided between the upper edge of the electrode 2422 and the frames 2420 to define a developer inlet 2425, and another opening is provided between the lower edge of the electrode 2422 and the frames 2420 to define a developer outlet 2428.

The developer inlet 2426 is communicated with a developer supply tank (not shown), and a predetermined amount of a developer is supplied to the developing chamber 2424 through the developer inlet 2428 during a developing operation. The developer is formed by dispersing finely-divided toner particles in a solvent, and a charging adjusting agent is added to the developer so that the toner particles are readily charged negative. The developer outlet 2428 is communicated with a developer receiving tank (not shown). The arrangement is such that the developer is circulated between the the developer receiving tank and the developer supply tank by means of a known pump. In addition, pumped air is discharged from the developer inlet 2426 when a developing operation for a single frame is completed, so that the developer after the development is quickly and smoothly discharged from the developer outlet 2428.

Recesses 2442 are respectively formed on the outer sides of the projecting frames 2442. Each recess 2442 is partially opened and communicated with a known evacuating mechanism such as a suction pump so that each recess 2442 serves to suck the developer leaking out from the developing chamber 2424. It should be noted that pipes which connect together various devices are not shown in FIGS. 2(A) and 2(B).

The drying section 2408 is provided with projecting frames 2446. The frames 2446 are respectively formed along three sides of the section 2408, that is, the upper and two lateral sides thereof. The distance between the right and left frames 2446 is larger than that between the frames 2412. A wall 2448 is formed inside the frames 2446 in such a manner that the surface of the wall 2448 is located at a position which is slightly inner than the end faces of the frames 2446. A U-shaped recess 2450 is defined between the wall 2448 and the three frames 2446. The space surrounded by the frames 2446, the wall 2448 and the recess 2450 defines a drying chamber 2452. An opening is formed in a portion of the recess 2450 which is located at the upper side of the wall 2448, so as to provide a warm air outlet 2454.

The fixing section 2410 is defined by the left-hand (as viewed in FIG. 2(A)) frame 2446 and a projecting wall 2456 which is provided at the left-hand (as viewed in FIG. 2(A)) end of the processing head 24. The space in the section 2410 defines a fixing chamber 2458. A xenon lamp 2460 and a reflecting plate 2461 therefor are disposed in the fixing chamber 2458. The width of opening of the fixing chamber 2458 is set such as to be wider than that of the drying chamber 2452.

It should be noted that the respective end faces of the projecting frames 2412, 2420 and 2446 are flush with each other. In addition, the positional relationship between the the charging exposure chamber 2414, the developing chamber 2424, the drying chamber 2452 and the fixing chamber 2458 is so set that four consecutive frames of the electrophotographic film 16 can face these chambers respectively, at the same time.

As shown in FIG. 2(B), a pressing plate 2466 is disposed in opposing relation to the front surface of the processing head 24. The pressing plate 2466 is adapted to press the electrophotographic film 16 against the processing head 24, thereby accurately positioning the film 16 and enabling the film 16 and the head 24 to be in close contact with each other in a satisfactory way. When the film 16 is moved, it is released from the pressing by the plate 2466.

A projecting light source 32 and a lens 34 are provided on the side of the film 16 which is remote from the processing head 24, the light source 32 and the lens 34 being disposed on the optical axis 35 of the lens 26. The electrophotographic film 16 may be accommodated in a cassette. In such case, if there is provided a recording mirror (not shown) which is inserted at a position which opposes the charging exposure chamber 2404 of the processing head 24 with respect to the film 16 when the cassette is loaded on this apparatus, the optical path can be changed, and this is therefore advantageous when arranging the lens 34 and the projecting light source 32.

Between the document 30 and the processing head 24 is disposed a mirror 38 which is pivoted about a shaft 36 by means of a motor 37. Any one of the frame images 22 recorded on the film 16 is formed on the screen 40 in such a manner that the light from the projecting light source 32 is passed through the lens 34, the film 16 and the lens 26 and reflected by the mirror 38 so as to be projected on the screen 40. Another mirror 44 is disposed on the side of the optical axis 35 which is remote from the mirror 38, the mirror 44 being adapted to be pivoted about a shaft 42 by means of a motor 43. Thus, any one of the frame images 22 recorded on the film 16 can be copied on a sheet of copying paper (not shown) in the copying device 46 in such a manner that the light from the projecting light source 32 is passed through the lens 34, the film 16 and the lens 26 and reflected by the mirror 44 so as to form a particular frame image 22 on the copying paper.

The take-up shaft 12 is rotated by a motor 48, and the take-up shaft 14 is rotated by a motor 50. The angle of rotation of the take-up shaft 12 is detected by a pulse generator 52, while the angle of rotation of the take-up shaft 14 is detected by a pulse generator 54, and the rotational speeds of the motors 48, 50 are respectively feedback-controlled in accordance with the outputs of the generators 52, 54. A light-emitting element 55 and a light-receiving element 56 are disposed in opposing relation to each other across the tape 10 so as to detect the blip marks 21. In addition, a recording and reproducing head 60 and an erasing head 58 are provided for the magnetic tape 18 of the tape 10 so as to record, reproduce or erase frame data.

A cassette loading detector 62 is disposed in this image data processing apparatus to detect the fact that a cassette accommodating the electrophotographic film 16 is loaded on the apparatus. Further, the operator actuates the keys on a control keyboard 66 while viewing the display on an LED display 64 to operate this apparatus and input data therein.

Calculation and control required for the operation of this apparatus are effected by a microcomputer 68. The microcomputer 68 has a CPU 70, a ROM 72; a RAM 74, an input port 76, an output port 78, and a bus 79 for connecting these members.

The input port 76 is supplied with signals from the pulse generators 52, 54, the light-receiving element 56, the cassette loading detector 62 and the control keyboard 66. The input por 76 is further supplied with a reproducing signal from the recording and reproducing head 60 through a magnetic tape interface 86.

The output port 78 is connected through a driver circuit 80 with the processing head 24, the illuminating light source 28, the projecting light source 32, the motors 37, 43, the copying device 46 and the light-emitting element 55. Thus, the processing head 24 is controlled so as to effect charging, light exposure, drying and fixing. During an exposure operation, the illuminating light source 28 is turned on, whereas, during a projecting or copying operation, the motor 37 or 43 is rotated to pivot the mirror 38 or 44, and the projecting light source 32 is turned on. When the motor 48 or 50 is rotated, the light-emitting element 55 is turned on. The motors 48, 50 are connected to the output port 78 through a D/A converter 82 and a driver circuit 84, so that the rotational speed of the motor 48 or 50 is controlled in a multiplicity of steps immediately after starting or immediately before stopping the operation of the motor. The output port 78 is further connected with the recording and reproducing head 60 and the erasing head 58 through the magnetic tape interface 86, so that, when recording is effected, an erasing signal is supplied to the erasing head 58, and a recording signal is supplied to the recording and reproducing head 60. In addition, the output port 78 is connected with the LED display 64 through a driver circuit 88, so that a display signal is supplied to the LED display 64.

Figure 2C:
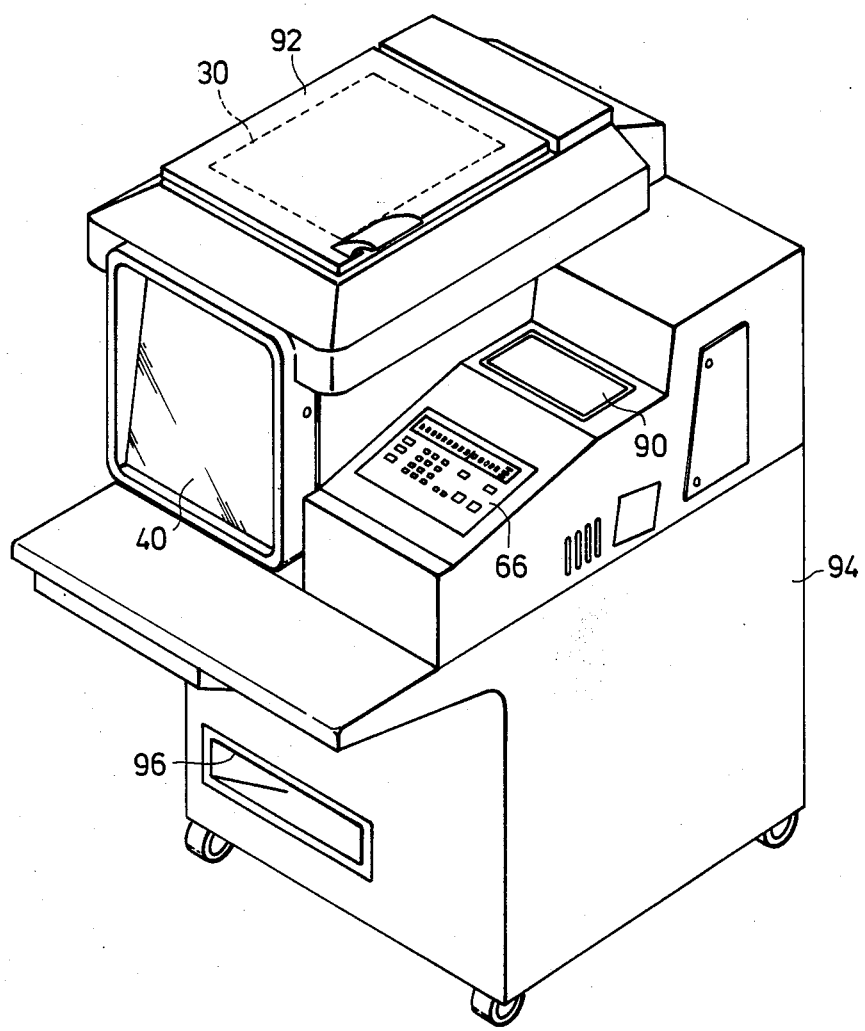

FIG. 2(C) is a perspective view showing the external appearance of this embodiment, arranged as detailed above. In this embodiment, a cassette is loaded into a cassette loading section 90, and the image of a document 30 pressed by a document pressing white plate 92 is recorded on an electrophotographic film accommodated in the cassette. The recorded image may be projected on the screen 40, or the image may be copied by the copying device 46 incorporated in a housing 94, and a copy of the image is taken out of an opening 96 provided in the housing 94. These processing operations are carried out in accordance with the key input control effected from the control keyboard 66.

Figure 3:
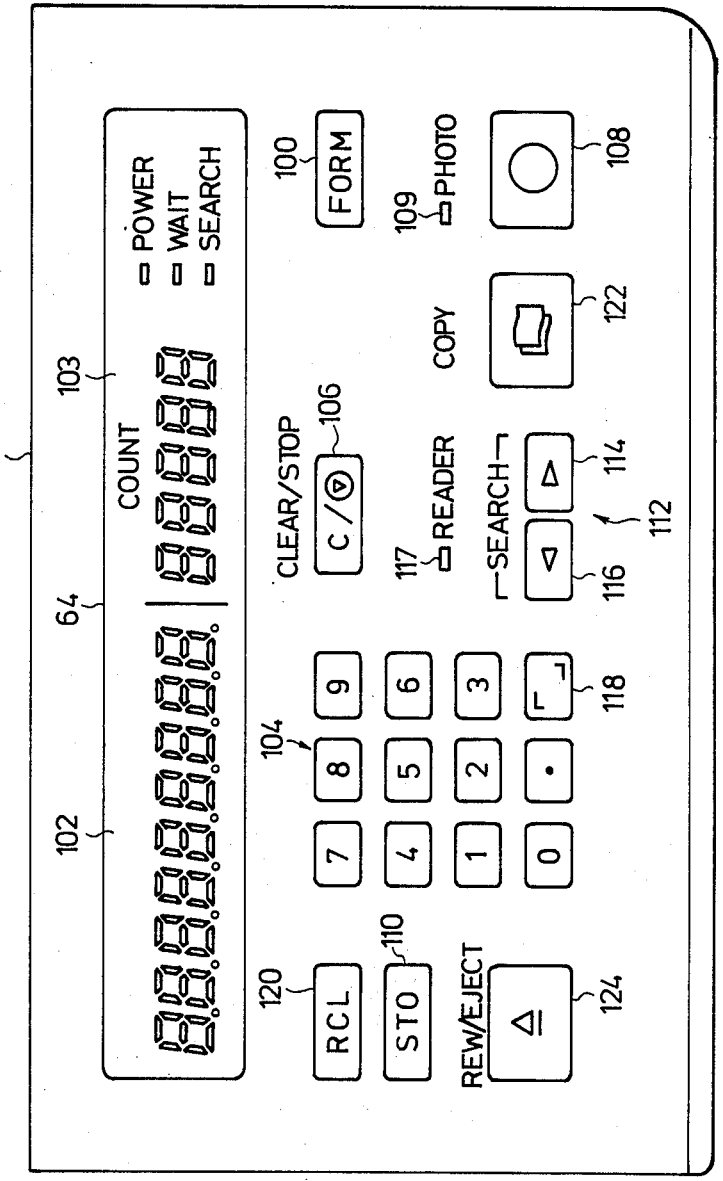
FIG. 3 is an enlarged detailed view of the control keyboard shown in FIG. 2(C)
Figure 4:
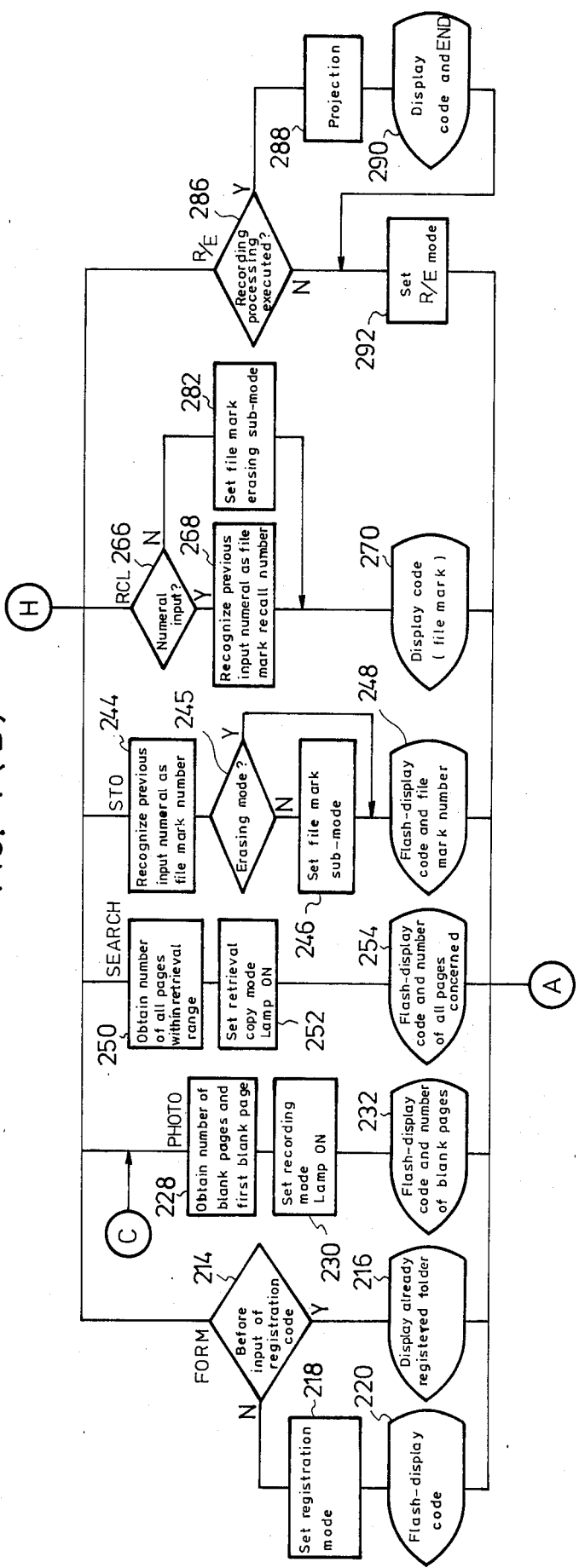
FIGS. 4(A), 4(B), and 4(C) are flowcharts schematically showing the registration of folder, recording, retrieval and copying.

FIG. 3 is a detailed view of the control keyboard 66, and FIG. 4 schematically shows a flowchart of processing operations executed by the key input control from the control keyboard 66. Various processing operations will be explained below with reference to FIG. 4.

It should be noted that the term "absolute address" will hereinafter be employed to identify a particular frame on the electrophotographic film 16, the absolute addresses respectively corresponding to the ordinal numbers of the blip marks 21 counted from the end of the film 16 which is closer to the magnetic tape 18. The term "cord" employed in this employed means a set of numerals, that is, a super-division number (folder F), an intermediale-division number (item J) and a sub-division number (page P), which is represented by, for example, "100.2.3". The super-division number is employed to discriminate folders one from the other, and the size or magnitude of the super-division number has no relation with the arrangement order of folders. The intermediate-division and sub-division numbers represent a relative address counted from the top of the folder identified by a particular super-division number. In the above-described example "100.2.3", the code represents the third frame from the top in the second item. Further, "file mark" employed in this embodiment is a mark which consists of a four-digit numeral and which is used to retrieve documents which are related to each other independently of the division numbers.

The relationship between the absolute address, code and file mark will be explained later in detail.

Referring to FIG. 4, when the power supply is switched on, the work area in the RAM 74 and output signals are initialized (Step 200). In this state, the apparatus is in the retrieval copy mode. When a cassette is loaded into the cassette loading section 90 (Step 202), the cassette loading detector 62 is turned on, and the data recorded on the magnetic tape 18 is read by the microcomputer 68 through the recording and reproducing head 60 and stored in the RAM 74.

[Registration of Folder]

This operation is to register a folder which is identified by the super-division number. For example, when the code "100.5.10" is registered, five items each containing ten pages are prepared in a folder with the number "100".

Accordingly, a folder having a total of 50 pages is prepared.

This will be explained below with reference to FIG. 4. When, a FORM key 100 is pressed in Step 206, the process proceeds through steps 208, 210, 212 and 214, and the code representing a folder which has already been registered is displayed in Step 216. This display operation is effected by a code display section 102 in the LED display 64. When the FORM key 100 is pressed again, the process proceeds from Step 206 to Step 216 in a manner similar to the above, and the code representing another folder which has already been registered is displayed.

Then, in Step 206, a ten-key switch 104 is actuated to input, for example, the code "100.5.10". In consequence, this code is stored in Step 222 and displayed by the code display section 102 in Step 224. When the FORM key 100 is pressed in Step 206, the process proceeds through Steps 208, 210, 212 and 214 to Step 218, in which the registration mode is set, and the input code is flash-displayed in Step 220. In other words, the operator is asked to check whether or not the displayed code is the one which is to be registered.

Then, the FORM key 100 is pressed again in Step 206. In consequence, the process proceeds through Steps 208 and 210, and the input folder code is registered in Step 226.

Thus, the FORM key 100 serves as both a mode change key and an entry key. The same is the case with the other function keys, as described later. Accordingly, the operation is facilitated, and the control keyboard 66 can be simplified.

When a CLEAR/STOP key 106 is pressed in Step 206, the process proceeds through Step 208, and the registration mode is cleared in Step 228. Then, the code which has been displayed is cleared in Step 224.

[Recording]

The following is a description of an operation of recording the image of a document on the electrophotographic film 16.

In Step 206, a recording area is designated by inputting, for example, the code "100.2". This means that recording is to be effected on the first unexposed or blank page in the item 2 of the folder No. 100. This code is stored in Step 222 and displayed in Step 224.

Then, a PHOTO key 108 is pressed in Step 206. In consequence, the process proceeds through Steps 208, 210 and 212, and the number of blank pages in the item 2 of the folder No. 100 and the first blank page are obtained in Step 228. Then, in Step 230 the operation mode is changed to the recording mode, and a mode display lamp 109 is turned on. In Step 232, the code stored in Step 222 and the obtained number of blank pages are respectively flash-displayed on the code display section 102 and the count display section 103.

Then, a document is set, and the PHOTO key 108 is pressed in Step 206. In consequence, the process proceeds through Steps 208, 210 and 234, and the code representing the blank page obtained in Step 228 in the previous control process is displayed on the code display section 102 in Step 238. Then, the film is fed (Step 240) until the portion of the film represented by the above-described code reaches the recording position, and recording is effected (Step 242). The process then proceeds through Steps 228 and 230, and the code concerned and the number of blank pages are flash-displayed in Step 232.

Then, a subsequent document is set, and the PHOTO key 108 is pressed in Step 206. In consequence, Steps 208, 210, 234, 238 to 242 and 228 to 232 are executed in the same manner as the above.

It should be noted that, if the code "100" is input in place of the code "100.2", recording is carried out sequentially from the first unexposed (blank) page in the folder No. 100.

It is possible to put a file mark on a frame which is to be subjected to recording next while the code and the number of blank pages are being flash-displayed as a result of execution of Step 232. This is done in such a manner that a file mark number is input by actuating the ten-key switch 104 and a STO key 110 is then pressed.

When, for example, the numeral 20 is input in Step 206, Steps 208, 222 and 224 are executed, and when the STO key 110 is pressed in Step 206, the process proceeds through Steps 208, 210 and 212, and the numeral 20 is defined as file mark number. Then the file mark sub-mode is set (Step 246), and the code concerned and the input file mark number are flash-displayed (Step 248). The file mark number is displayed on the count display section 103. Then, when the PHOTO key 108 is pressed in Step 206, the process proceeds through Steps 208, 210 and 234, and the input file mark number is set in Step 236. Thereafter, Steps 238 to 242 and 228 to 232 are executed in the same manner as the above.

[Retrieval and Projection]

Retrieval and projection of a page which has already been subjected to recording will be explained below.

The CLEAR/STOP key 106 is first pressed in Step 206, and Steps 208, 228 and 224 are executed, whereby the mode in the previous operation is cleared, and the display on the LED display 64 is cleared.

Then, a retrieval range is designated in Step 206. To retrieve, for example, a page within the item 2 in the folder No. 100, the code "100.2" is input in Step 206. In consequence, Steps 208, 22 and 224 are executed.

Then, either one of the SEARCH keys 112 is pressed in Step 206.

When, for example, the right-hand SEARCH key 114 is pressed, the process proceeds through Steps 208, 210 and 212, and the total number of pages within the retrieval range is obtained in Step 250. Then, the retrieval copy mode is set, and the mode display lamp 117 is turned on (Step 252). The code is flash-displayed in the code display section 102, and the total number of pages within the retrieval range is flash-displayed in the count display section 103 (Step 254). When the total number of pages within the retrieval range is, e.g., 3 in the above-described example, the display is as follows:

100.2.1        3

When the right-hand SEARCH key 114 is pressed again in Step 206, the process proceeds through Steps 208 and 210, and the electrophotographic film 16 is fed until the position represented by the code "100.2" reaches the processing position. Then, the designated frame image 22 is projected on the screen 40 (Step 258), and the LED display 64 displays the following code:

100.2.1        [

The symbol "[", which is displayed on the count display section 103, means that there is at least one projectable page in only the direction in which the page number increases (toward the right-hand end of the electrophotographic film 16 shown in FIG. 5). The term "projectable page" in this case means a frame image which has been recorded without any mistake.

When the right-hand SEARCH key 114 in the SEARCH keys 112 is pressed during the image projecting operation, retrieval is effected in the direction in which the page number increases, whereas, when the left-hand SEARCH key 116 is pressed, retrieval is effected in the direction in the the page number decreases.

Then, the process returns to Step 206 from Step 262, and when the right-hand SEARCH key 114 is pressed again in Step 206, the process proceeds through Steps 208, 210 and 212, and the film 16 is fed in Step 256 until a subsequent projectable page coincides with the optical axis 35. Then, the frame image concerned is projected (Step 258), and the LED display 64 displays the following information:

100.2.2        ] [

The symbol "] [" means that there are projectable pages in both rightward and leftward directions from the present position of the film 16 (the position of a frame located at the optical axis 35 shown in FIG. 1).

When the right-hand SEARCH key 114 is pressed again in Step 206, Steps 208, 210 and 256 to 260 are executed in the same manner as the above, and the LED display 64 displays the following information:

100.2.3        ]

The symbol "]" means that there is at least one projectable page only in the direction in which the page number decreases.

It should be noted that, when the SEARCH key 112 is continuously pressed longer than a predetermined period of time in Step 206, scrolling is effected. More specifically, the process proceeds from Step 260 to Steps 262 and 264, and if the retrieved position is still within the retrieval range, the execution of Steps 256 to 260 is repeated at a predetermined interval of time, and projection of frame images and display of information on the LED display 64 are successively carried out. This will be explained later in detail.

The following is a description of the operation in which retrieval and projection are effected using file marks.

The CLEAR/STOP key 106 is pressed to clear the display from the LED display 64 in the same manner as the above. Then, a file mark number is input by actuating the ten-key switch 104. In consequence, Steps 222 and 224 are executed.

Then, an RCL key 120 is pressed to designate that the input numeral is a file mark number. More specifically, the process proceeds through Steps 208 to 212 and 266, and the input numeral is recognized as a file mark recall number. Then, this file mark number is displayed on the count display section 103 (Step 270), and the process returns to Step 206.

Then, a SEARCH key 112 is pressed. In consequence, the same processing as that in the case where no file mark is put is executed except that the object of retrieval is any projectable page having the file mark coincident with the input file mark recall number rather than a retrieval range designated by a code consisting of folder, item and page numbers.

The following is a description of a retrieval and projecting operation in which a retrieval range is designated by a code consisting of folder, item and page numbers and only a page which is within the retrieval range and which has a designated file mark is retrieved and projected.

The CLEAR/STOP key 106 is pressed to clear the display from the LED display 64 in the same manner as the above. Then, a file mark number is input by actuating the ten-key switch 104. In consequence, Steps 222 and 224 are executed.

Then, the RCL key 120 is pressed to designate that the input numeral is a file mark number. More specifically, the process proceeds through Steps 208 to 212 and 266, and the input numeral is recognized as a file mark recall number in Step 268. Then, this file mark number is displayed on the count display section 103 (Step 270), and the process returns to Step 206.

Then, a retrieval range is designated in Step 206. For example, the code "100.2" is input. In consequence, Steps 222 and 224 are executed, and the code "100.2" is displayed on the code display section 102.

When the right-hand SEARCH key 114 is pressed in Step 206, Steps 208 to 212 and 250 to 254 are executed. When the right-hand SEARCH key 114 is pressed again in Step 206, the process proceeds through Steps 218 and 210, and the electrophotographic film 16 is fed in Step 256 until the first page which is within the retrieval range and whose file mark number is 20 is coincident with the projecting position. Thereafter, the same processing as that in the cas where no file mark is put is executed except that only a page which is within the retrieval range and which has the file mark is retrieved.

It should be noted that the retrieval operation will be explained later in details.

[Copying]

The following is a description of an operation conducted in the case where a retrieved page is copied.

It is assumed that, for example, the page which is represented by the code "100.2.2" is being projected. A number of required copies is first input by actuating the ten-key switch 104. In consequence, Steps 222 and 224 are executed. When a COPY key 122 is pressed, the process proceeds through Steps 206 to 210, and the code "100.2.2" and the number of required copies are displayed in Step 272. When the number of required copies is, for example, two, "C2" is displayed on the count display section 103. Then, copying is effected (Step 274), and when the number of copies which are to be taken is not 0 (Step 276), the execution of Steps 272 and 274 is repeated. When the copying operation is completed, the process proceeds to Step 260, in which the code and the projectable direction are displayed on the LED display 64. The process then returns to Step 206 from Step 262. It should be noted that, when the COPY key 122 alone is pressed in place of the designation of the number of required copies from the ten-key switch 104, only one copy is taken.

When a blank key 118 is pressed to designate the number of required copies, a group copy is carried out. More specifically, when the page represented by the code "100.2.2" is being projected, if the blank key 118 is pressed and the COPY key 122 is then pressed, all the exposed frame images 22 included in the retrieval range "100.2" are copied one for each.

It should be noted that the copying operation will be explained later in more details.

[Change or Erasure of File Mark]

The following is a description of the operation in which a file mark is changed or erased during retrieval.

For example, the numeral 50 is input from the ten-key switch 104 when the page represented by the code "100.2.2" is being projected. In consequence, Steps 222 and 224 are executed.

When a STO key 110 is pressed in Step 206, the process proceeds through Steps 208 to 212, and the numeral 50 is recognized to be a file mark number in Step 244. Then, the file mark sub-mode is set (Step 246), and the code "100.2.2" is flash-displayed on the code display section 102, while the file mark number "F50" is flash-displayed on the count display section 103 (Step 248).

When the STO key 110 is pressed again in Step 206, the process proceeds through Steps 208, 210 and 278, and the numeral 50 is set as a file mark. In this way, the file mark "50" is set on the frame image 22 represented by the code "100.2.2".

The operation of erasing a file mark will be explained below.

During retrieval, if the RCL key 120 is pressed in Step 206 when, for example, the page represented by the code "100.2.3" is being projected, the process proceeds through Steps 208 to 212 and 266, and the file mark erasing sub-mode is set in Step 282. Then, the code and the file mark (if attached to this code) are displayed on the count display section 103 (Step 270). For example, the display in this case is as follows:

100.2.2        F20

When the STO key 110 is pressed in Step 206, the process proceeds through Steps 208 to 212, 244 and 245, and the code and the file mark number are flash-displayed in Step 248 to ask the operator to check whether or not the displayed file mark number is to be erased.

When the STO key 110 is pressed again in Step 206, the process proceeds through Steps 208, 210 and 278, and the file mark 20 is erased in Step 284.

[Terminating Operation]

The following is a description of the operation carried out after the recording, retrieval, projection or copying operation has been completed.

When an REW/EJCT key 124 is pressed in Step 206, the process proceeds through 208 to 212, and a judgement is made in Step 286 as to whether or not recording has been executed. If YES, the process proceeds to Step 288, in which the latest recorded page is projected on the screen 40 to ask the operator if the cassette is to be unloaded or not. Then, the code concerned is displayed on the code display section 102, and the symbol "End" is displayed on the count display setion 103 (Step 290). Then, the rewind/eject mode is set (Step 292).

When the REW/EJECT key 124 is pressed again in Step 206, the process proceeds through Steps 208 and 210, and the take-up shaft 14 shown in FIG. 1 is rotated counterclockwise in Step 294 to rewind the electrophotographic film 16 and the magnetic tape 18 on the take-up shaft 14.

Then, the process proceeds to Step 296, in which the take-up shaft 12 is rotated clockwise, and the data concerning the film 16 stored in the RAM 74 is recorded on the magnetic tape 18. Then, the display on the code display section 102 is cleared, and the symbol "End" is displayed on the count display section 103 (Step 298). The cassette is raised so that it can be unloaded. The operator then unloads the cassette and turns off the power supply (Step 299). If NO is the answer in Step 286, that is, recording has not been executed, Steps 288 to 290 are not executed, and the proces immediately proceeds to Step 292. Thereafter, the same processing as that in the case where recording has been executed is carried out except that no projection processing is executed.

[Frame Data]

The following is a description of a practical arrangement of frame data with reference to FIGS. 6 to 9.

FIG. 6 shows an arrangement of frame data in the case where folders are first registrated by inputting the code "100.2.3" and the code "200.3.2" and the folder No. 100 is then expanded by inputting the code "100.3.3". When a registered folder is expanded, an expanded portion is registered in an unregistered area next to the registered area on the electrophotographic film 16. When a mistake occurs during recording due to undesirable turn-off of the power supply or other failures, areas for frames represented by the codes corresponding to those which represent defective frames are ensured on the film 16 in the reverse direction from the last frame position on the film 16. In the example shown in FIG. 6, a recording mistake occurs at the position represented by the code "100.2.2", and the frame represented by this code is recorded on the 1000th frame position, which is the last frame position on the film 16.

Recording can be effected on the electrophotographic film 16 at random, that is, the order in which frames are arranged on the film 16 can be ignored.

In retrieval, when, for example, the code "200" is input, the frame images 22 having the absolute addresses 7 to 10, respectively, can be retrieved, as will be clear from FIG. 6, and these frames can be sequentailly projected by pressing the right-hand SEARCH key 114. When the code "100.2" is input, the frame images 22 having the absolute addresses 4 and 1000, respectively, can be retrieved. When retrieval is effected using the file mark 10, the frame images 22 having the absolute addresses 1 and 7, respectively, can be projected. When retrieval is effected using the file mark 20, the frame imgages 22 having the absolute addresses 3 and 8, respectively, can be projected.

The operation carried out when copies are taken is similar to that in the case of projecting frame images 2.

FIGS. 7 and 8 correspond to FIG. 6. FIG. 7 is a folder table in which folder numbers are arraned in order of registration. FIG. 8 is an address table in which the frames on the electrophotographic film 16 are arranged in order of code, unlike the table shown in FIG. 6 in which the frames are arranged in order of absolute address.

As shown in FIG. 9, the discrimination between F, J and P is effected by two bits (division FJP) in each status bite. When FJP is 3, 2, 1 or 0, this represents F, J, P or END mark, respectively.

Each absolute address is represented by two bytes. The status byte also includes a recording completion flag C (when recording has been completed, the flag C is set, i.e., "1") and a recording mistake flag M (when a recording mistake occurs, the flag M is set, i.e., "1"). In addition, two bytes are ensured for a file mark for each frame. These five bytes are ensured for each of the frame images 22.

Since the division FJP is represented by two bits, the storage capacity can be minimized.

[Method of Obtaining Absolute Address]

The method of obtaining an absolute address from the corresponding code will be explained below with reference to FIGS. 7 and 8.

In the case of, for example, the code "100.1.3", since FIG. 7 shows that the folder No. 100 is the first folder, the first F is searched in FIG. 8. The folder F involves both the item J and the page P, and the number of "P"s is therefore counted to two rightward from the first F ("100.1.1"). The absolute address of this position is 3. In this way, the absolute address represented by the code "100.1.3" is found to be 3.

In the case of, for example, the code "200.2.2", since FIG. 7 shows that the folder No. 200 is the second folder, the second F from the left in FIG. 8 is searched. The folder F involves both the item J and the page P, and the item J involves the page P. Therefore, the first J ("200.2.1") which is located to the right of the second F ("200.1.1") is searched, and the first P which is located to the right of the first J is further searched. The absolute address of this position is 10. In this way, the absolute address represented by the code "200.2.2" is found to be 10.

The method of obtaining the absolute address of a target position (hereinafter referrred to as the "target absolute address") on the basis of the present position (the absolute address of the present position will be hereinafter referred to as the "present absolute address") will be explained below in detail with reference to FIG. 10.

It is assumed in the following description that the present position is represented by the code "100.1.3" (see a in FIG. 8) and the target position is represented by the code "200.2.2" (see e in FIG. 8).

The code "200.2.2" representing the target position is input in Step 300. Then, the ordinal number of this folder No. 200 is obtained from the folder table shown in FIG. 7. In this example, the folder No. 200 is the second folder, and the value for L is determined to be 2 (Step 302). If the folder number concerned is not found in the folder table (Step 304), warning is given to the operator (Step 306), and the process returns to the main routine.

Figure 10B:
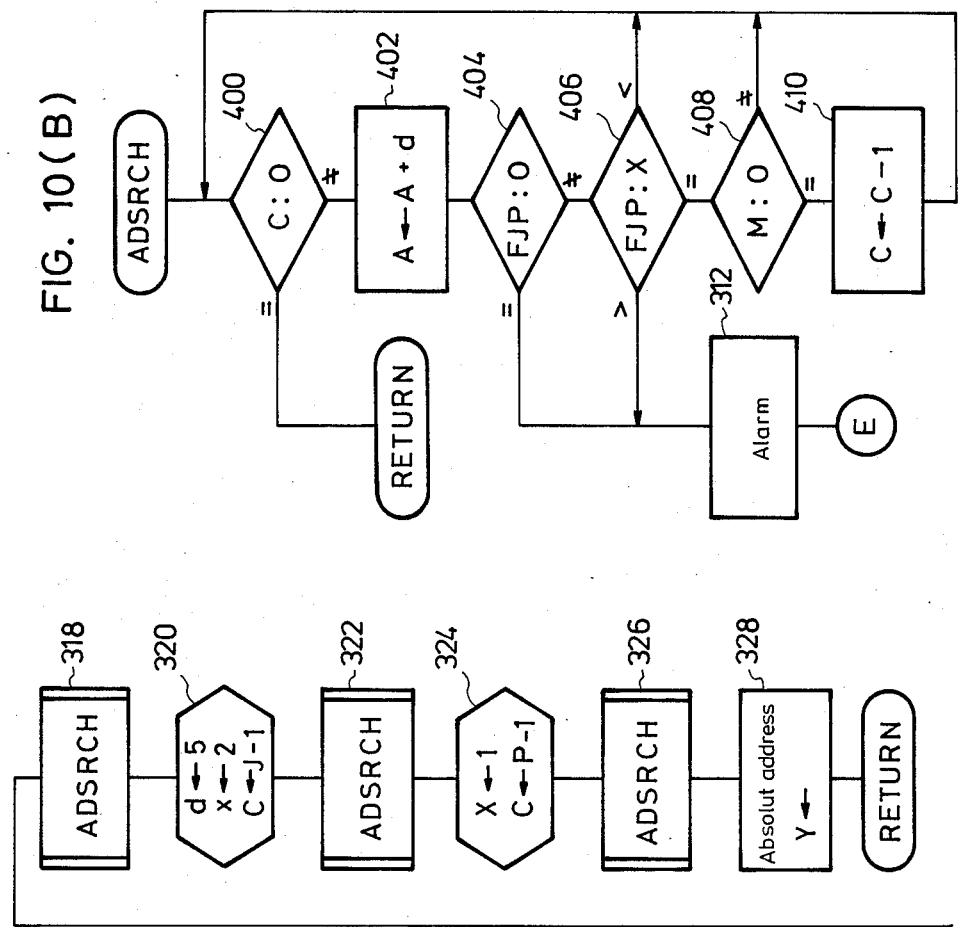
FIGS. 10(A) and 10(B) are flowcharts for obtaining an absolute address of a target position from a present position when a code representing a target position is input.
Figure 10A:
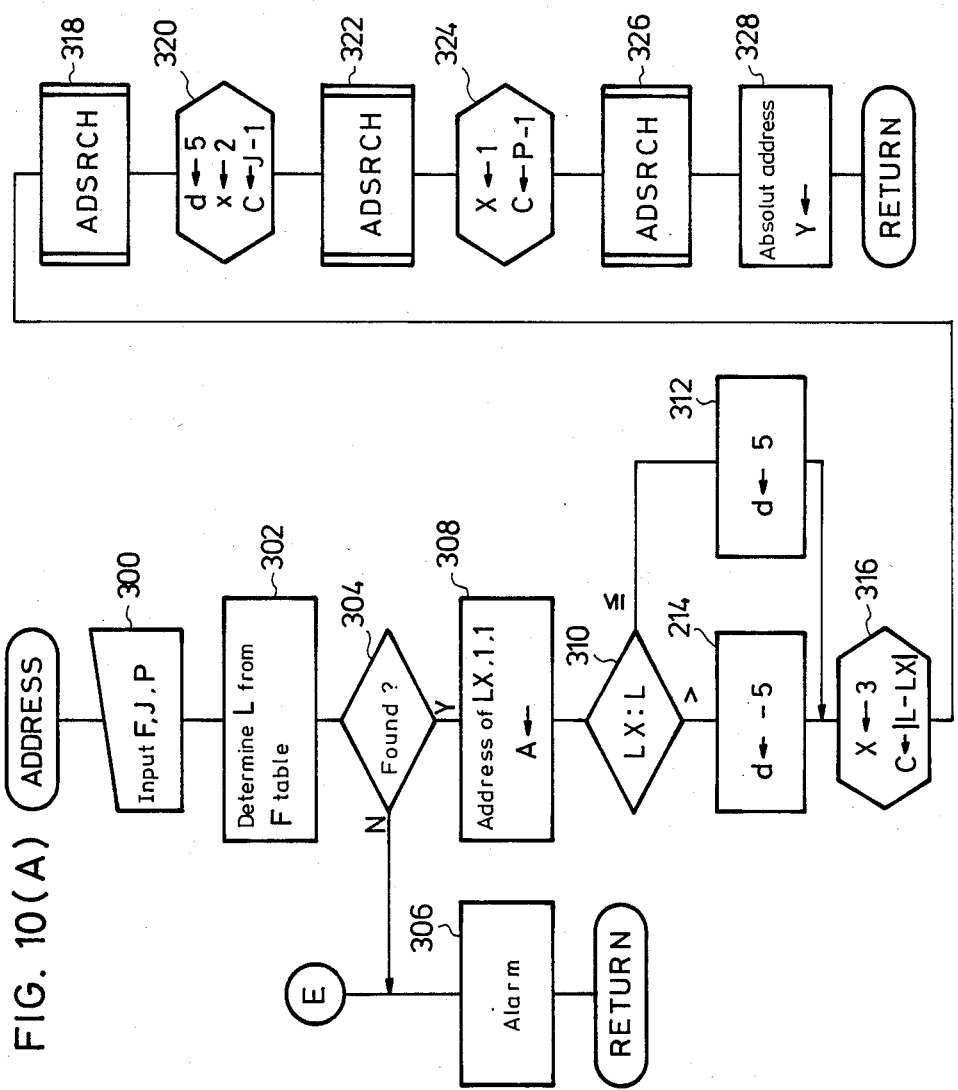

Then, the address A on the memory of the reference position ("1OO.1.I") of the folder to which the present position belorigs is obtained (Step 308). This is done for the purpose of simplifying the program by systematically handling the data concerning the target position whether or not the target position is in the same folder as the present position, as will be understood from the description below. In Step 308, the value of LX is the value for L of the present position, and it is 1 in this example. The value for A is obtained as the address of the position of the first F which is located to the left of the position a in FIG. 8. Accordingly, the value for A is 0. Since the condition of LX<L is acknowledged in Step 310, 5 is set as the value for d (Step 312). The value for this d is based on the fact that frame data for each frame image 22 consists of 5 bytes as shown in FIG. 9. Then, the values for X and C which are employed in the subroutine shown in FIG. 10(B) are determined in Step 316.

The value for X is 3, 2 or 1 when the FJP is F, J or P, respectively. The value for C is 1 in this example, and this means to obtain the position c of the first F to the right of the position b in FIG. 8 as will be described later. Then, the subroutine shown in FIG. 10(B) is executed in Step 318.

Since the value of C is 1, the process proceeds from Step 400 to Step 402, in which the value (=5) of d is added to the value for the address A on the memory. The symbol for FJP shown in FIG. 9 at the renewed address A is found to be P from FIG. 8, and FJP is therefore 1. Accordingly, the process proceeds from Step 404 to Step 406. Since the value of X is 3 and consequently FJP<X, the process returns to Step 400. When the execution of Steps 400 to 406 is repeated ten times, the position of c in FIG. 8 is reached. Consequently, the value of FJP is acknowledged to be 3 in Step 406, and the process proceeds to Step 408. As shown in FIG. 6, the frame image 22 represented by the code "200.1.1" has no recording mistake, and the value of M is therefore 0. Accordingly, the process proceeds to Step 410, in which the value of C is decremented by 1 so as to be 0, and the process returns to Step 400 and then returns to the routine shown in FIG. 10(A).

Then, 5, 2 and J—1 are respectively set as the values for d, X and C in Step 320. Since J is 2, the value of C is 1. Then, the subroutine shown in FIG. 10(B) is executed in Step 322. When the execution of Steps 400 to 304 is repeated twice in the same manner as the above, the position d shown in FIG. 8 is reached, so that the value of FJP is acknowledged to be 2 in Step 406, and the process then proceeds to Step 408. The frame image 22 at the position represented by the code "200.2.1" has no recording mistake as will be clear from FIG. 6, and M=0 is acknowledged in Step 408. The process therefore proceeds to Step 410, in which the value of C is decremented by 1. In consequence, the value of C becomes 0, and the process returns to Step 400 and then returns to the routine shown in FIG. 10(A).

Then, 1 and P—1 are respectively set as the values for X and C in Step 324. Since the value of P is 2, the value of C is 1. Then, the subroutine shown in FIG. 10(B) is executed in Step 326. When the execution of Steps 400 to 406 is carried out once in the same manner as the above, the value of FJP becomes 1, and the process therefore proceeds to Step 408. Since the condition of M=0 is met at this position as will be understood from FIG. 6, the process proceeds to Step 410, in which the value of C is decremented by 1. In consequence, the value of C becomes 0, and the process returns to Step 400 and then returns to the main routine.

Then, the absolute address (see FIG. 9) stored at the addresses A+1 and A+2 is set as the value for Y in Step 328. Thus, the value of Y is 10. The process then returns to the main routine.

In this way the absolute address of the target position represented by the code "200.2.2" is obtained as the value of Y.

The method of obtaining the absolute address of a target position which is in the same folder as the present position will be explained below.

It is assumed that the present position is "100.2.2" (the absolute address 100) and the target position is "100.1.3". The execution of Steps 300 to 308 is carried out in the same manner as the above, and searching is effected until the first F which is located to the left of the position f in FIG. 8 is found. The first F is found at the position b, and the value of the address A on the memory is obtained (A=0). Then, the process proceeds to Step 316 through Steps 310 and 312. Both the values of L and LX are 1, and the value of C is therefore 0. Accordingly, even when the subroutine shown in FIG. 10(B) is executed in Step 318, the process returns from Step 400 to the routine shown in FIG. 10(A) and proceeds to Step 320. This is because the position b and the target position a are in the same folder. In Step 320, 0 is set as the value for C, and the process therefore returns from Step 400 and proceeds to Step 324 in the same manner as the above. This is because the position b and the target position a are in the same item. Then, 2 is set as the value for C in Step 324. In consequence, the execution of Steps 400 to 410 is repeated twice, and the process returns to the routine shown in FIG. 10(A). Then, 3 is set as the value for Y in Step 328, and the process then returns to the main routine.

Thus, it is possible to obtain the absolute address of a target position by the same processing method whether or not the target position is in the same folder as the present position.

The feed of the electrophotographic film 16 from the present position to the target position is carried out in the following manner.

The difference between the absolute address of the target position, obtained as detailed above, and the absolute address of the present position, which has already been obtained, is calculated, and whether the film 16 is to be fed rightwardly or leftwardly is determined in accordance with the sign of the difference therebetween. Then, the film 16 is fed, and the feed of the film 16 is stopped when the number of blip marks 21 counted up reaches the absolute value of said difference. Thus, the frame at the target position is fed to the position of the optical axis 35.

[Details of Retrieval]

The details of retrieval will be explained below with reference to the flowcharts shown in FIGS. 11 to 13. These flowcharts show various processing operations carried out after a retrieval range has been designated by the ten-key switch 104. In other words, the flowcharts show the processing operations executed from the time when the SEARCH key 112 is first pressed to the time when projection of all the frame images 22 within a designated retrieval range is completed.

Simple retrieval will first be explained.

Figure 11:
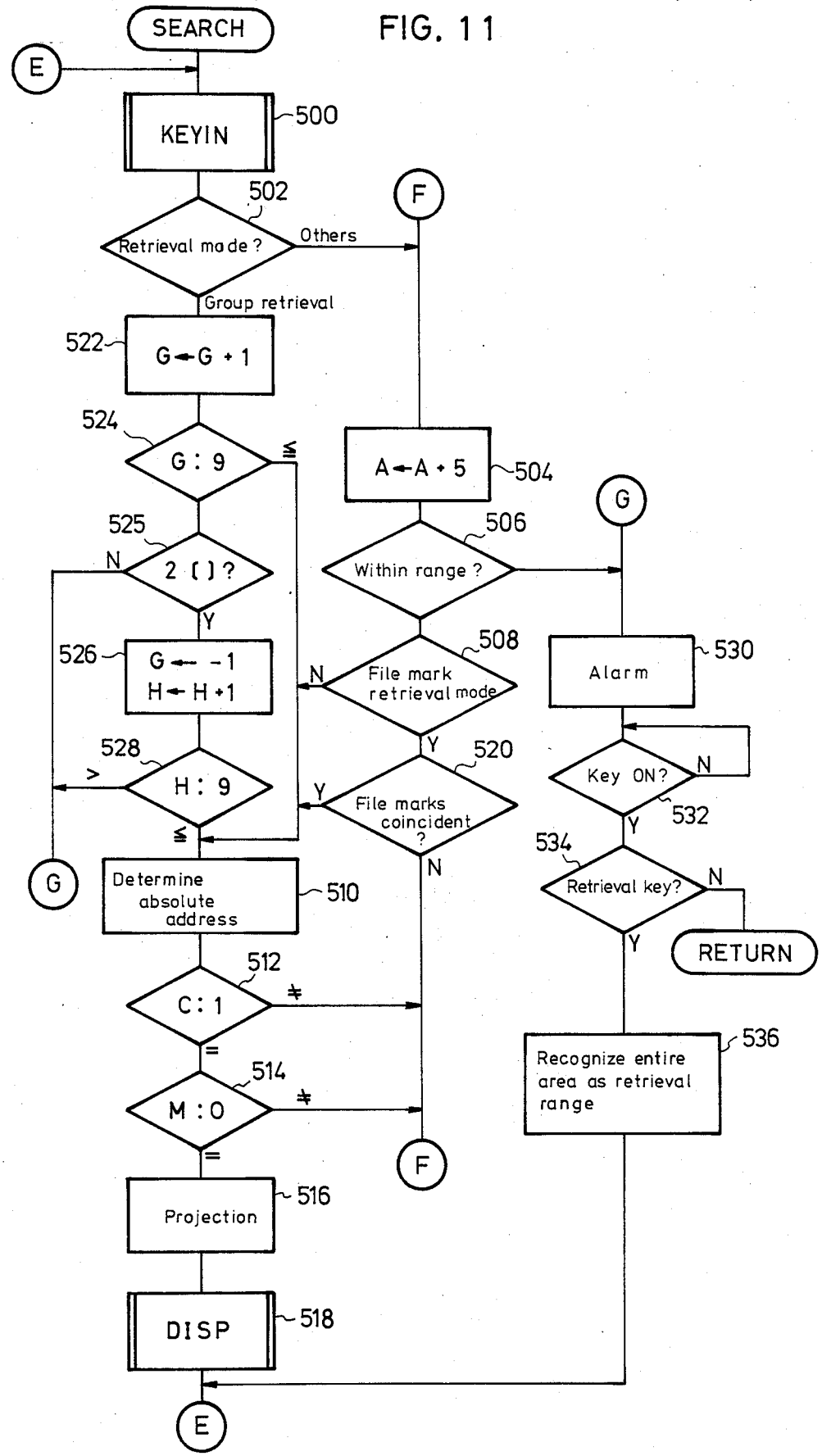
FIG. 11 is a flowchart showing a retrieval operation.
Figure 12:
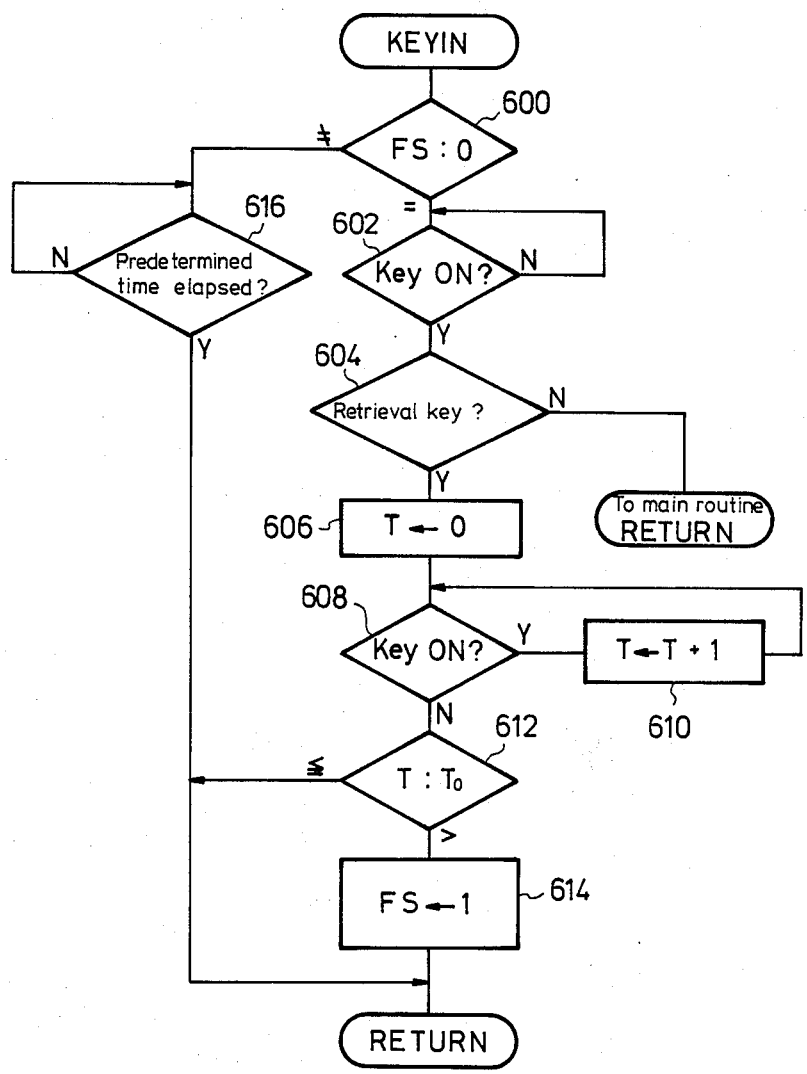
FIGS. 12 and flowcharts respectively showing subroutines used in the flowchart shown in FIG. 11.

Referring to FIG. 11, the input processing for the SEARCH key 11 is executed in Step 500. This processing is carried out according to the subroutine shown in FIG. 12.

Since the value for the scroll flag FS has already been initialized to 0, the process proceeds from Step 600 to Step 602, in which an input from any key is awaited. When the SEARCH key 112 is pressed, the process proceeds through Step 604 to Step 606, in which 0 is set as the value for the counter T. When it is judged in Step 608 that the key 112 is being pressed, the process proceeds to Step 610, in which the value of the counter T is incremented by 1, and the process then returns to Step 608. When the key 112 is released, the process shifts to Step 612, and when the value of the counter T is not greater than a predetermined value $T_0$, the process returns to Step 500.

When the value of the counter T exceeds the value $T_0$, the process proceeds to Step 614, in which the scroll flag FS is set, and the process then returns to Step 500. In other words, when the SEARCH key 112 is pressed longer than a predetermined period of time, the scroll flag FS is set, and the scroll retrieval is initiated.

When the scroll flag FS has been set, the process shifts from Step 600 to Step 616 in a subsequent execution, and after a predetermined period of time has elapsed, the process returns to Step 500. Accordingly, when the execution of Steps 516 and 518 (described later) is completed within the retrieval range, the process shifts to Step 500, and after a predetermined period of time has elapsed, specific processing operations from Step 502 to Step 518 are executed again. Thereafter, this is repeated to effect scroll retrieval.

In the case of simple retrieval, the process shifts from Step 502 to Step 504, in which 5 is added to the value of the address A on the memory in the address table. When this address A is within the retrieval range, the process shifts from Step 508 to Step 510, in which the absolute address shown in FIG. 9 is read off. Then, the recording completion flag C in the status byte shown in FIG. 9 is examined, and when the completion of recording is acknowledged, the process proceeds to Step 514, in which the recording mistake flag M is examined, and when the frame concerned has no recording mistake, the process shifts to Step 516, in which the frame image 22 is projected on the screen 40. Then, the process proceeds to Step 518, in which the code and the direction in which there is at least one retrievable frame are displayed on the LED display 64.

Figure 13:
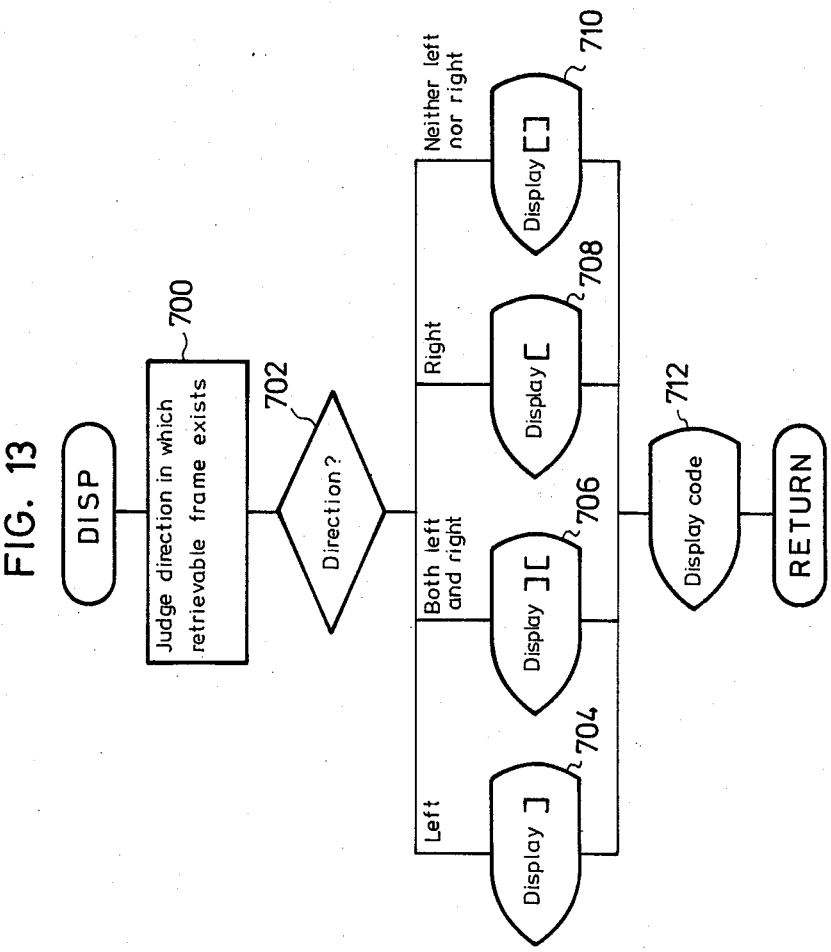

This subroutine is shown in FIG. 13. More specifically, the direction in which there is at least one retrievable frame is judged in Step 700, and a branch to any one of Steps 704 to 710 is implemented in accordance with the direction judged in Step 702. When at least one retrievabl frame is located to the left of the present position of the electrophotographic film 16, the symbol "]" is displayed in Step 704; when retrievable frames are present to both the right and left of the present position of the film 16, the symbol "][" is displayed in Step 706; when at least one retrievable frame exists to the right of the present position of the film 16, the symbol "[" is displayed in Step 708; and when there is no more retrievable frame, the symbol "[]" is displayed in Step 710. These symbols are displayed on the count display section 103. Then, the process proceeds to Step 712, in which the code representing the present position is displayed on the code display section 102, and the process then returns to the routine shown in FIG. 11.

Thereafter, as long as the address A is within the designated retrieval range, the execution of Steps 500 to 518 is repeated. In scroll retrieval, this operation is repeated at a predetermined interval of time. Otherwise, said operation is repeated every time the SEARCH key 112 is pressed.

When it is judged in Step 506 that the address A is out of the retrieval range, the process proceeds to Step 530, in which alarm is sounded to inform the operator of the completion of the projection of all the frames within the retrieval range. Then, an input from any key is awaited in Step 532, and when a key input is available, the process proceeds to Step 534. When the SEARCH key 112 is pressed in Step 532, the limitation on the retrieval range is removed, and specific processing operations from Step 500 to Step 518 are repeated. When any key other than the SEARCH key 112 is pressed in Step 532, the process returns to the main routine (not shown), and the retrieval processing is ended.

File mark retrieval will be explained below.

In this retrieval operation, the process shifts from Step 508 to Step 520 in the above-described retrieval processing, and a judgement is made as to whether or not the file mark which is to be retrieved and the file mark on the memory are coincident with each other. If NO, the execution of Steps 504 to 520 is repeated. If YES is the answer in Step 520, that is, if the two file marks are coincident with each other, the process shifts from Step 520 to Step 510, and processing which is similar to that in the case of the above-described simple retrieval is executed thereafter.

Group retrieval will be explained below.

It is assumed in this example that the blank key 118 is pressed with respect to one or two positions or digits in F.J.P for simplification of the description. Further, each of F.J.P is assumed to be one-digit figure. It should be noted that the value of the counter G hereinafter represents the value for the right-hand side blank, and the value of the counter H represents the value for the left-hand side blank. For example, when the desi9nated retrieval range is "5.[].1", "[]" corresponds to the value of the counter G. When the retrieval range is "[].[].1", the folder number corresponds to the value of the counter H, and the item number corresponds to the value of the counter G.

In the group retrieval, after the execution of Steps 500 and 502, the process shifts to Step 522, in which the value of the counter G is incremented by one. The initial value of the counter G is −1, and the initial value of the counter H is O. This initialization is executed in the main routine (not shown).

The following is a description of the operation conducted when the retrieval range is "[].[].1"

The code of the target position is set such as to be "0.0.1" in Step 522. Then, the process shifts from Step 524 to Step 510, in which the absolute address of the target position is determined using the subroutine shown in FIG. 10. Then, after the execution of Steps 512 to 518, 500 and 502, Step 522 is executed again in the same manner as that in the case of the simple retrieval. This processing is repeated, and when the value of the counter G reaches 10, the process shifts to Step 525. Since two "[]" symbols are employed in this example, the process proceeds to Step 526, in which the value of the counter G is initialized to −1, and the value of the counter H is incremented by one. In consequence, the retrieval code becomes "1.0.1". then, the process proceeds from Step 528 to Step 510, in which the above-described processing is repeated. In this way, the retrieval processing is repeated until the value of the counter G reaches 9, and when the value of the counter G reaches 10, the value of the counter G is initialized to −1 again and the value of the counter H is set to 2 in Step 526. This processing repeated, and when the value of the counter H reaches 10 in Step 528, the target position is out of the retrieval range, and the process therefore shifts to Step 530, in which the processing which has already been described above is executed.

It should be noted that group retrieval can be designated with respect to any digit in each of the folder, item and page numbers. For example, when "12[]5" is input, the numbers of tens are blank-designated, so that retrieval is effected within a range from "1205" to "1295". It is a matter of course that blank designation may be made over a plurality of digits.

[Addition of File Mark in Retrieval Stage]

The following is a description of the method in which the smae file mark is put to specific frames in the retrieval stage, and the frames with this file mark are copied en bloc.

Figure 14:
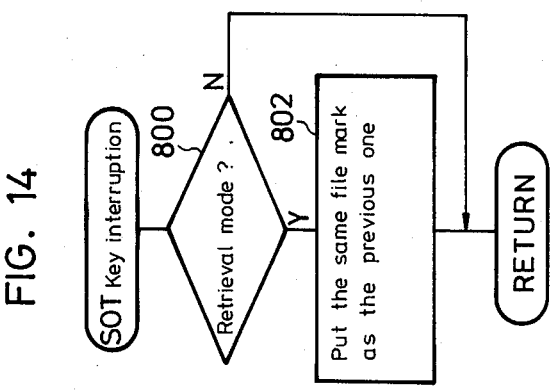
FIG. 14 shows a key input interruption processing routine for sequentially adding the same file mark in the retrieval stage.

FIG. 14 shows an interrupt processing executed when the STO key 110 is pressed. When the STO key 110 is pressed, a judgement is made in Step 800 as to whether or not the present operation mode is the retrieval mode. If NO, the process returns without executing any processing. If YES is the answer in Step 800, the process proceeds to Step 802, in which the same file mark as that put to a previous frame is put to the frame which is being projected. Then, the process returns.

Figure 4C:
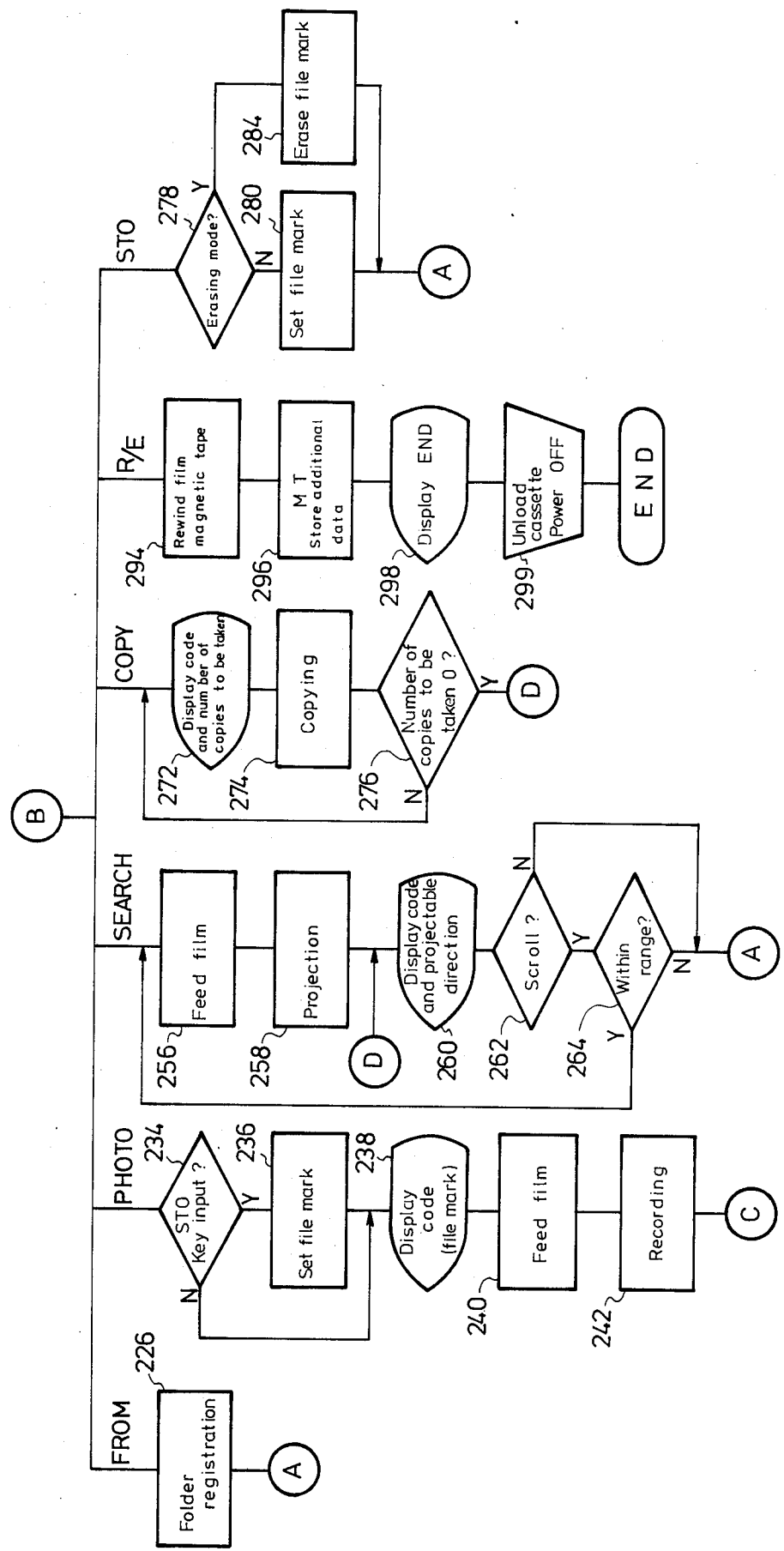

Accordingly, when the execution of Steps 256 to 264 shown in FIG. 4(C) is repeated, it is possible to put the same file mark to frames which are desired to be copied later simply by pressing the STO key 110. If this file mark is designated as a copy range, copies of the frames can be taken en bloc later.

It is possible, according to this method, to readily designate frames to be copied without individually designating the respective codes of frames which are desired to be copied.

It is particularly convenient to add the file mark during the scroll retrieval.

It should be noted that the flag S in the status byte shown in FIG. 9 may be set in Step 802. The flag S may be automatically reset after the frames having the flag S set only have been copied en bloc in response to the depression of the COPY key 122.

[Details of Copying

Figure 15:
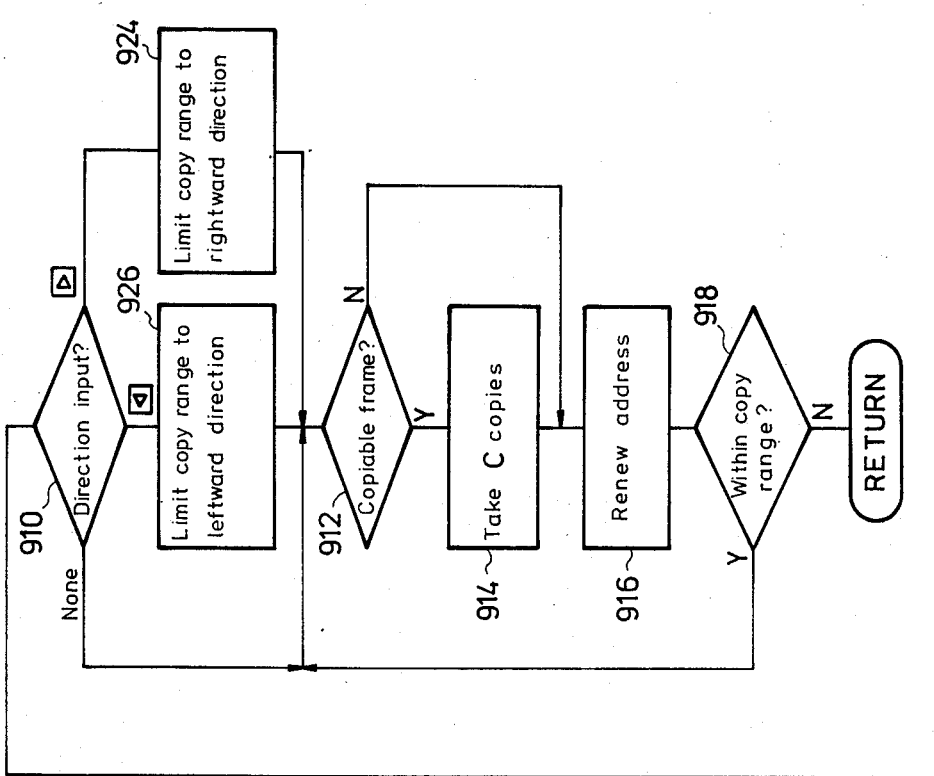
FIG. 15 is a flowchart showing a copying operation.
Figure 15:
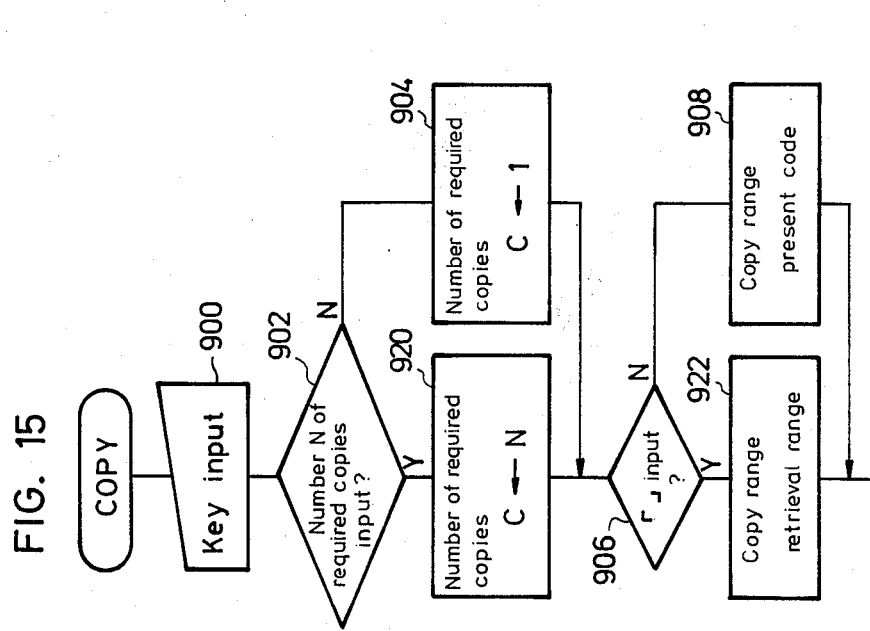

The following is a description of the copying method carried out when the retrieval copy mode is set, with reference to the flowchart shown in FIG. 15.

A copy range and the number of required copies are designated by actuating the keyboard in Step 900. When no copy range is input, the frame which is being projected alone is designated as a copy range. When the number of required copies is not input, the number of required copies is designated to be one. The operation will be explained below by way of practical examples.

The operation conducted when the COPY key 122 alone is pressed will first be explained. In this case, the process proceeds from Step 902 to Step 904, in which 1 is set as the number of required copies C. Then, the process proceeds through Step 906 to Step 908, in which the code representing the frame being projected alone is designated as a copy range. Then, the process proceeds through Step 910 to Step 912, in which a judgement is made as to whether or not the frame being projected is a copiable frame. When the counter G is 1 and the recording mistake flug M is 0 the frame is judged to be a copiable frame. In this example, since only the frame which is being projected and hence projectable is to be copied, the frame concerned is, of course, a copiable frame. The process therefore proceeds to Step 914, in which only one copy is taken. Then, the process proceeds to Step 916, in which the address is renewed, and the renewed address is judged to be out of the copy range in Step 918, thus completing the copy processing.

The following is a description of the operation conducted when a number of required copies is first input by the ten-key switch 104 and the COPY key 122 is then pressed in Step 900. In this case, the process proceeds from Step 902 to Step 920, in which the number N which has been input through the ten-key switch 104 is set as the number of required copies C. In step 914, a number of copies which is equal to the set number C are taken. The other points of this operation are similar to those in the case described above.

In the case where the blank key 118 is first pressed and the COPY key 122 is then pressed in Step 900, the process proceeds through Steps 902, 904 and 906, and the retrieval range which has been set before starting this routine is designated as a copy range in Step 922. This retrieval range depends on the type of retrieval, that is, simple retrieval, group retrieval or file mark retrieval, as already described above. Then, the process proceeds to Step 918 through Steps 910 and 912 to 916, and when the renewed address is within the copy range, the execution of Steps 912 to 918 is repeated. In this way, all the frames within the retrieval range are copied one for each.

When, in Step 900, a number of required copies N is input by the ten-key switch 104 and the blank key 118 is pressed and then the COPY key 122 is pressed, the same operation as the above is conducted except that a number of copies which is equal to the number N are taken for each of the frames within the retrieval range.

The following is a description of the operation conducted when the blank key 118, the right-hand SEARCH key 114 and the COPY key 122 are successively pressed in Step 900. In this case, the process proceeds from Step 910 to Step 924, in which, within the range which has been designated to be the same as the retrieval range in Step 922, the area which is located to the right of the present position in the address table shown in FIG. 8 is set as a copy range.

In the case where the left-hand SEARCH key 116 is pressed in place of the right-hand SEARCH key 114 in the above-described example, the process shifts from Step 910 to Step 926, in which the area which is located to the left of the present position in the address table is designated as a copy range.

It should be noted that, although the image data processing apparatus according to the present invention is applied to a camera processor reader printer for microfilm in the above-described embodiment, the present invention may be widely applied to any type of monofunctional or multifunctional apparatus which effects projection, display, retrieval and recording of image data, for example, an apparatus which projects image data on a screen, an apparatus which displays image data on a CRT, or an apparatus which records image data on a recording medium such as a film or a disk.

Although an electrophotographic film has been described as an example of a film for recording image data or a film having image data recorded thereon, this is not necessarily limitative, and it is also possible to employ conventional films, such as silver halide film, thermoplastic film, photomigration type thermal developing film, and thermal developing type silver halide film. In addition, the magnetic tape which is spliced to the leading end of the electrophotographic film may be replaced with a storage medium such as a semiconductor memory.

Thus, in the image data processing apparatus according to the present invention, division data is input by an input means and stored in a frame data memory means before recording, and when recording, retrieval, projection or the like is carried out, division data and a relative address in the division are input through the input means. In consequence, a target absolute address determining means obtains a target absolute address from the input division data, the input relative address in the division and the frame data stored in the frame data memory means. A film moving means moves the frames on the film so that a present absolute address obtained by an absolute address determining means is coincident with the obtained target absolute address. It is therefore possible to readily store frame images in order on the film without the need to consider the physical arrangement of the frame images. Thus, retrieval operation is facilitated, and it is possible to reduce the amount of required retrieval data, advantageously.

What is claimed is:

1. An image data processing apparatus, which comprises:
    (a) a recording medium provided with marks before a document is recorded thereon, said marks being employed to set absolute addresses respectively corresponding to frames in each of which a frame image and frame data are recorded;
    (b) first absolute address determining means for obtaining the absolute address of a frame present at a processing position by counting the number of said marks;
    (c) input means for inputting each of the divisions which separate the frames on said recording medium into blocks, together with the relative address of each of the frames within said input division;
    (d) frame data memory means for storing frame data in such a manner that the divisions, the relative addresses of frames within each of the divisions, and the absolute addresses of the frames are arranged so as to correspond to each other;
    (e) second absolute address determining means for obtaining the absolute address of a frame which is to be processed, said absolute address corresponding to the division and the relative address of said frame within said division which are input through said input means;

(f) feed amount calculating means for calculating an amoun of feed of said recording medium which is needed to move said frame to be processed to the processing position from the difference between the absolute address obtained by said second absolute address determining means and the absolute address obtained by said first absolute address determining means;

(g) recording medium moving means for moving said frame to be processed to the processing position in accordance with the calculated amount of feed; and (h) image processing means for processing the image of said frame present at the processing position, whereby frame images can be readily put in order, and retrieval thereof is facilitated.

2. An image data processing apparatus according to claim 1, wherein said image processing means includes recording means for recording a document on said recording medium.

3. An image data processing apparatus according to claim 2, wherein said recording means has a processing head which subjects said recording medium to processing operations including charging., exposure, developing, drying and fixing, so that frame image is recorded on said recording medium.

4. An image data processing apparatus according to claim 3, wherein said image processing means further includes projecting means for projecting a frame image recorded on said recording medium, and copying means for copying said frame image.

5. An image data processing apparatus according to claim 4, wherein said processing head includes a first lens, so that the light from an illuminating light source is reflected from said document and passed through said lens to form the image of said document on said recording medium.

6. An image data processing apparatus according to claim 5, wherein said projecting means includes a projecting light source and a second lens on which the light from said projecting light source is made incident, said projecting light source and said second lens being disposed on the optical axis of said first lens and on the side of said recording medium which is remote from said processing head.

7. An image data processing apparatus according to claim 6, wherein said image processing means further includes a screen for forming the image of a frame recorded on said recording medium by means of the light which is emitted from said projecting light source, passed through said second lens, said recording medium and said first lens and reflected from said first mirror so as to be projected on said screen.

8. An image data processing apparatus according to claim 7, wherein said copying means includes said projecting light source, said second lens, said first lens, a second mirror which is disposed on the opposite side to said first mirror and which is rotated by a second motor, and a copying device on which the image of a frame on said recording medium is formed by means of the light which is emitted from said projecting light source, passed through said second lens, said recording medium and said first lens and reflected from said second mirror so as to be applied to said copying device.

9. An image data processing apparatus according to claim 8, wherein said recording medium is a tape-like material composed of an electrophotographic film and a magnetic tape.

10. A image data processing apparatus according to claim 9, wherein said tape-like material is accommodated in a cassette, said image data processing apparatus further comprising a cassette loading detector for detecting the fact that said cassette is loaded into said apparatus.

11. An image data processing apparatus according to claim 10, further comprising a recording and reproducing head and an erasing head for the magentic tape of said tapelike material, so that frame data can be recorded, reproduced an erased by said recording and reproducing head and said erasing head.

12. An image data processing apparatus, which comprises:

(a) a recording medium provided with marks before a document is recorded thereon, said marks being employed to set absolute addresses respectively corresponding to frames in each of which a frame image and frame data are recorded;

(b) first absolute address determining means for obtaining the absolute address of a frame present at a processing position by counting the number of said marks;

(c) input means for inputting each of the divisions which separate the frames on said recording medium into blocks, together with the relative address of each of the frames within said input division;

(d) frame data memory means for storing frame data in such a manner that the divisions, the relative addresses of the frames within each of the divisions, and the absolute addresses of the frames are arranged so as to correspond to each other;

(e) division absolute address determining means for designating the frames of the starting and terminating ends to be processed within the division input through said input means to determine the absolute addresses of the same with reference to said relationship between the divisions, the relative addresses of the frames within each of the divisions, and the absolute addresses of the frames;

(f) feed amount calculating means for calculating an amount of feed of said recording medium which is needed to move the frame located at said starting end to the processing position from the difference between the absolute address of the frame at said starting end and the absolute address of the frame present at said processing position;

(g) recording medium moving means for successively moving the frames to said processing position from the frame at said starting end to the frame at said terminating end in accordance with the calculated mount of feed and the absolute address of the frame at said terminating end; and (h) image processing means for effecting image processing of the frame at said processing position, whereby frame images can be readily put in order, and retrieval thereof is facilitated.

13. An image data processing apparatus according to claim 12, wherein said image processing means includes recording means for recording a document on said recording medium.

14. An image data processing apparatus according to claim 13, wherein said recording means has a processing head which subjects said recording medium to processing operations including charging, exposure, developing, drying and fixing, so that frame image is recorded on said recording medium.

15. An image data processing apparatus according to claim 14, wherein said image processing means further includes projecting means for projecting a frame image recorded on said recording medium, and copying means for copying said frame image.

16. An image data processing apparatus according to claim 15, wherein said processing head includes a first lens, so that the light from an illuminating light source is reflected from said document and passed through said lens to form the image of said document on said recording medium.

17. An image data processing apparatus according to claim 16, wherein said projecting means includes a projecting light source and a second lens on which the light from said projecting light source is made incident, said projecting light source and said second lens being disposed on the optical axis of said first lens and on the side of said recording medium which is remote from said processing head.

18. An image data processing apparatus according to claim 17, wherein said image processing means further includes a screen for forming the image of a frame recorded on said recording medium by means of the light which is emitted from said projecting light source, passed through said second lens, said recording medium and said first lens and reflected from said first mirror so as to be projected on said screen.

19. An image data processing apparatus according to claim 18, wherein said copying means includes said projecting light source, said second lens, said first lens, a second mirror which is disposed on the opposite side to said first mirror and which is rotated by a second motor, and a copying device on which the image of a frame on said recording medium is formed by means of the light which is emitted from said projecting light source, passed through said second lens, said recording medium and said first lens and reflected from said second mirror so as to be applied to said copying device.

20. An image data processing apparatus according to claim 19, wherein said recording medium is a tape-like material composed of an electrophotographic film and a magnetic tape.

21. An image data processing apparatus according to claim 20, wherein said tape-like material is accommodated in a cassette, said image data processing apparatus further comprising a cassette loading detector for detecting the fact that said cassette is loaded into said apparatus.

22. An image data processing apparatus according to claim 21, further comprising a recording and reproducing head and an erasing head for the magentic tape of said tapelike material, so that frame data can be recorded, reproduced and erased by said recording and reproducing head and said erasing head.

* * * * *